US006523958B2

(12) United States Patent
Takezawa et al.

(10) Patent No.: US 6,523,958 B2
(45) Date of Patent: Feb. 25, 2003

(54) OPTICAL COMPONENT AND PROJECTOR USING THE SAME

(75) Inventors: Takeshi Takezawa, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 09/813,861

(22) Filed: Mar. 22, 2001

(65) Prior Publication Data
US 2001/0046032 A1 Nov. 29, 2001

(30) Foreign Application Priority Data
Mar. 24, 2000 (JP) ........................................ 2000-085001

(51) Int. Cl.⁷ ............................................... G03B 21/14
(52) U.S. Cl. ........................ 353/20; 359/494; 359/495; 359/497; 359/500
(58) Field of Search ............................ 353/20; 359/494, 359/495, 497, 500, 488

(56) References Cited
U.S. PATENT DOCUMENTS
5,365,345 A    11/1994  Propst et al.
5,497,268 A    3/1996   Tang
5,644,428 A    7/1997   Heinrich
6,219,112 B1 * 4/2001   Yoneyama et al. ............ 349/5
6,268,961 B1 * 7/2001   Nevitt et al. .................. 349/84

FOREIGN PATENT DOCUMENTS
EP    1 016 894 A2    7/2000
JP    A 10-325954    12/1998
JP    A 11-231277     8/1999
JP    A 11-337919    12/1999
JP    A 2000-193927   7/2000
JP    A 2000-206507   7/2000

* cited by examiner

Primary Examiner—Russell Adams
Assistant Examiner—Michelle Nguyen
(74) Attorney, Agent, or Firm—Oliff & Berridge, PLC

(57) ABSTRACT

A technology is provided which makes it possible to easily produce an optical component without considerably deteriorating the optical characteristics of the optical component. The optical component includes a glass substrate, an optical member which is connected to the glass substrate, and a connecting layer used to connect a surface of the glass substrate and a surface of the optical member together. The connecting surface of the glass substrate is defined as the surface which passes light processed by the optical component, and has a roughness of approximately 3 nm to approximately 10 nm in terms of the rms value.

23 Claims, 11 Drawing Sheets

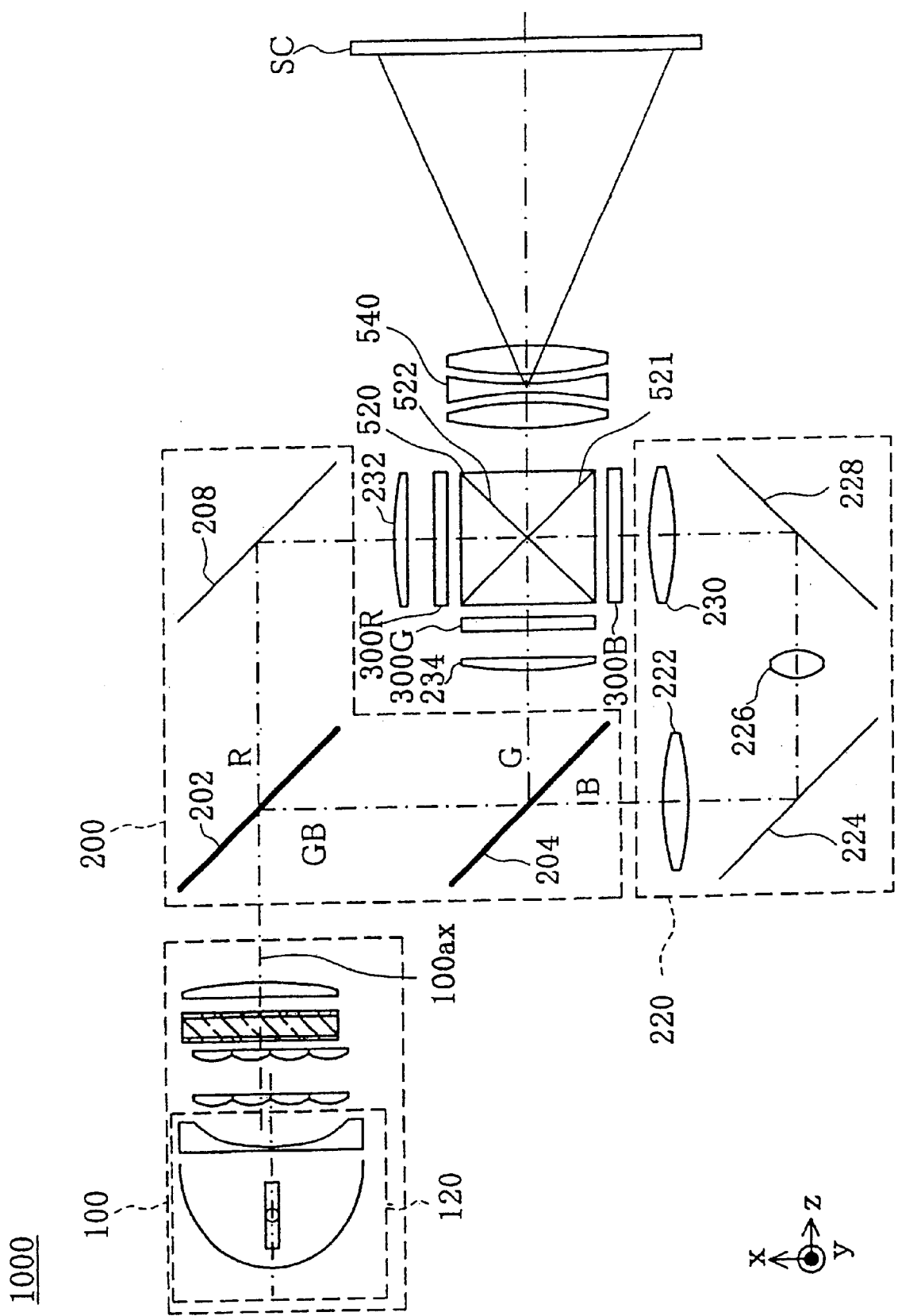
[FIG. 1]

[FIG. 2]
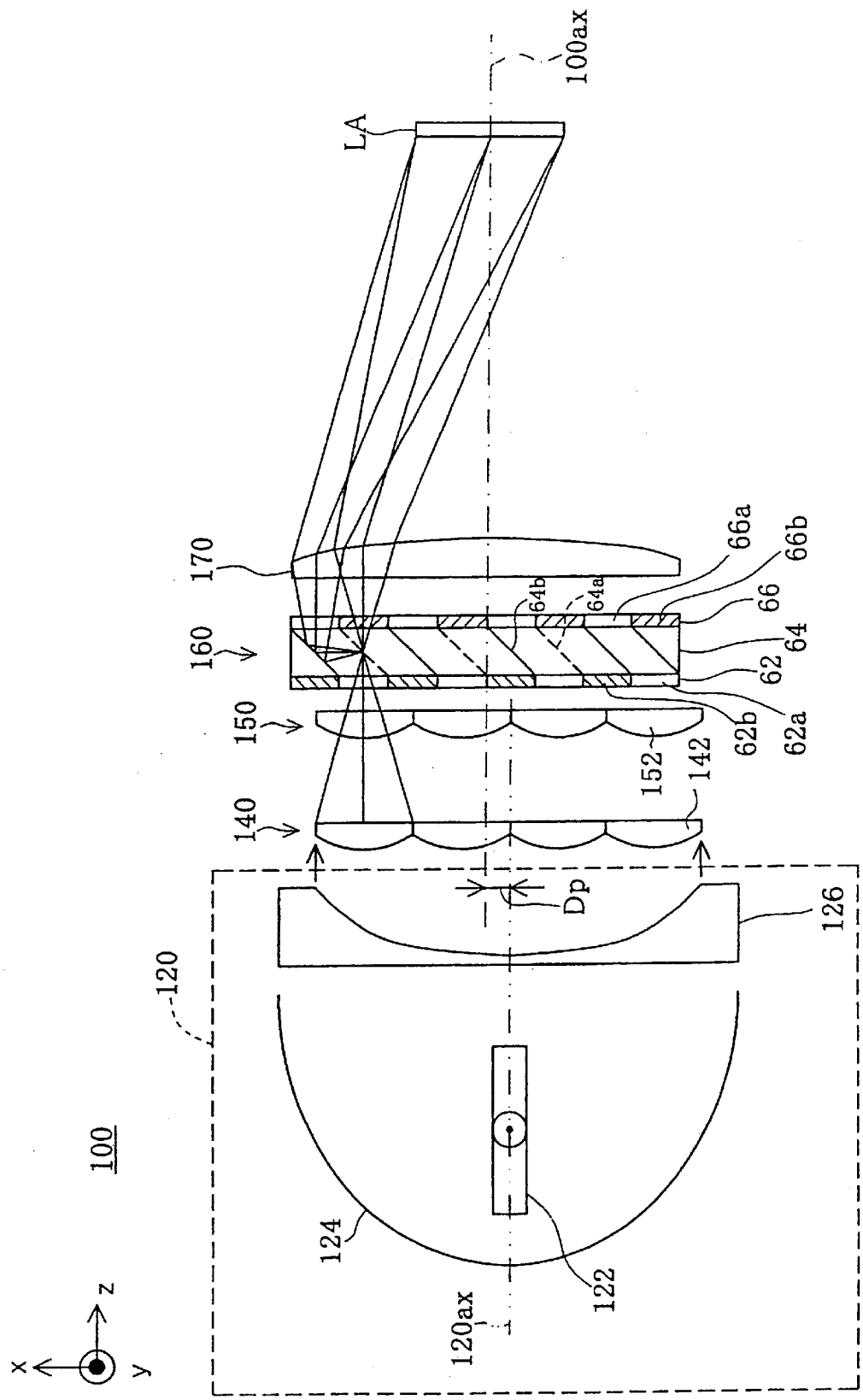

[FIG. 3]
(A)
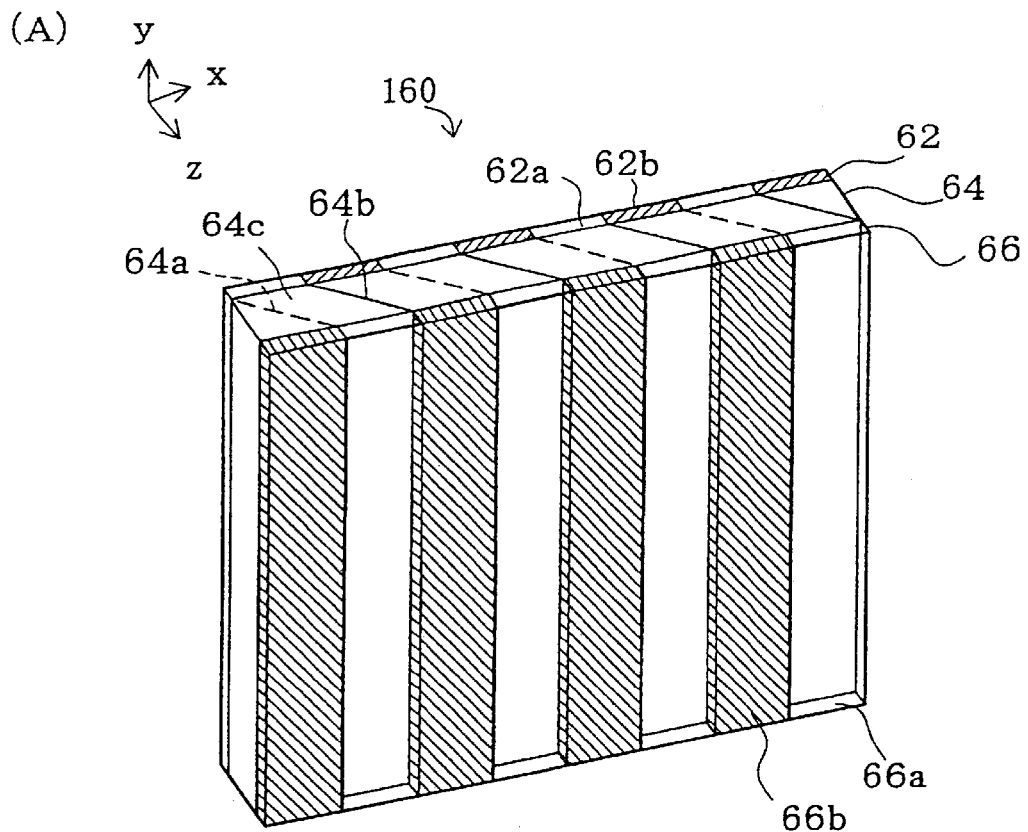
(B)
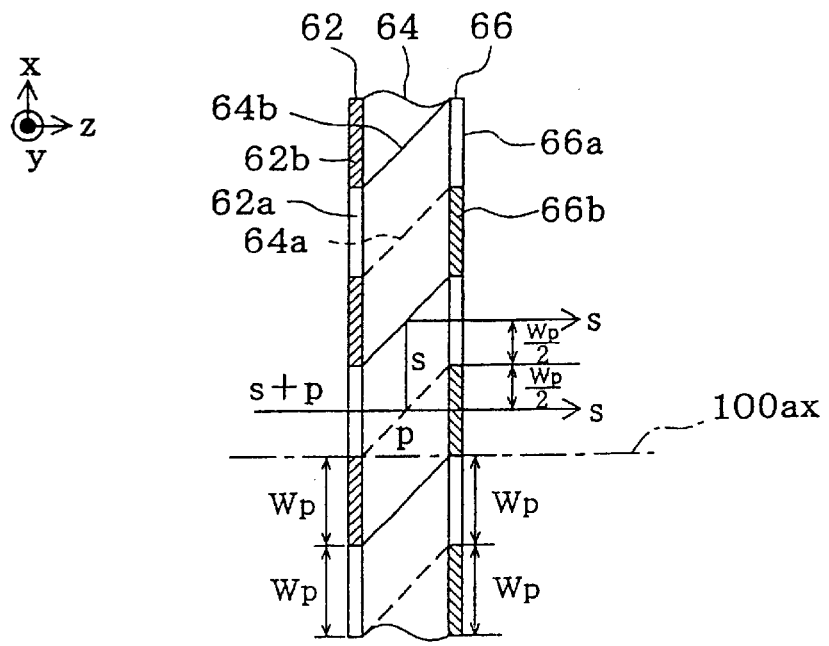

[FIG. 4]
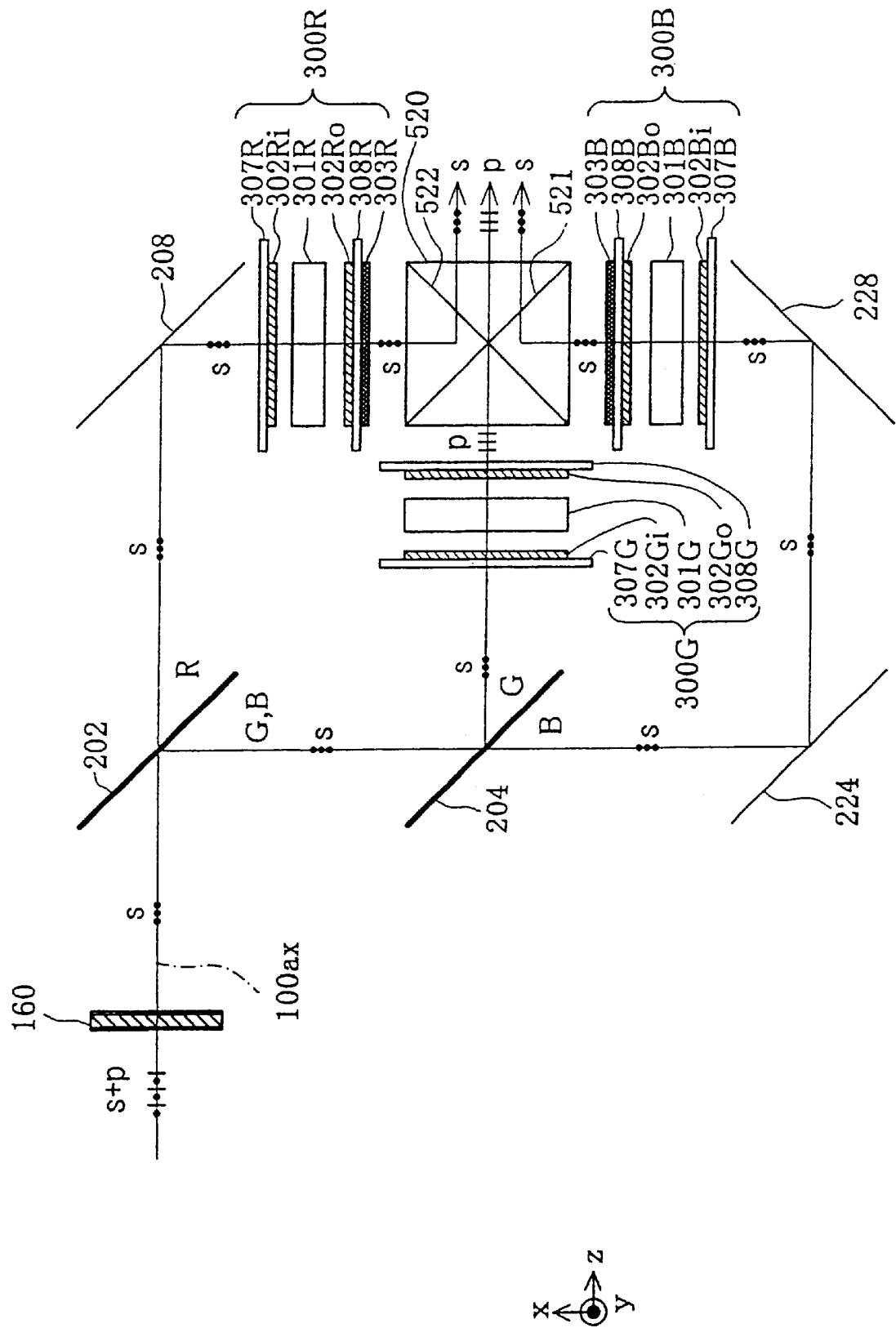

[FIG. 5]
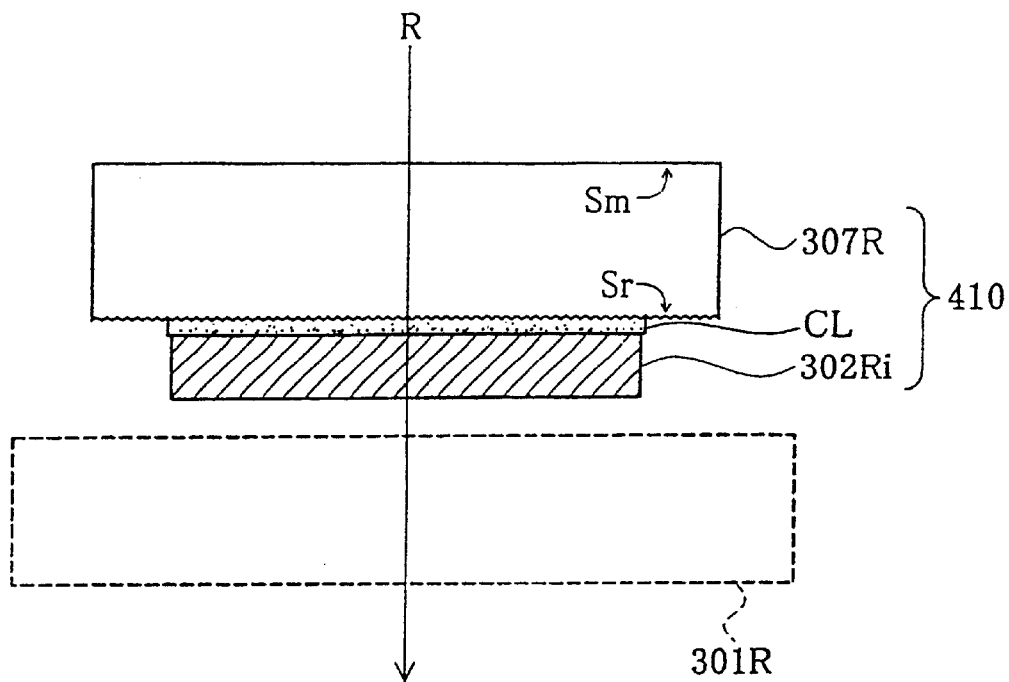
[FIG. 6]
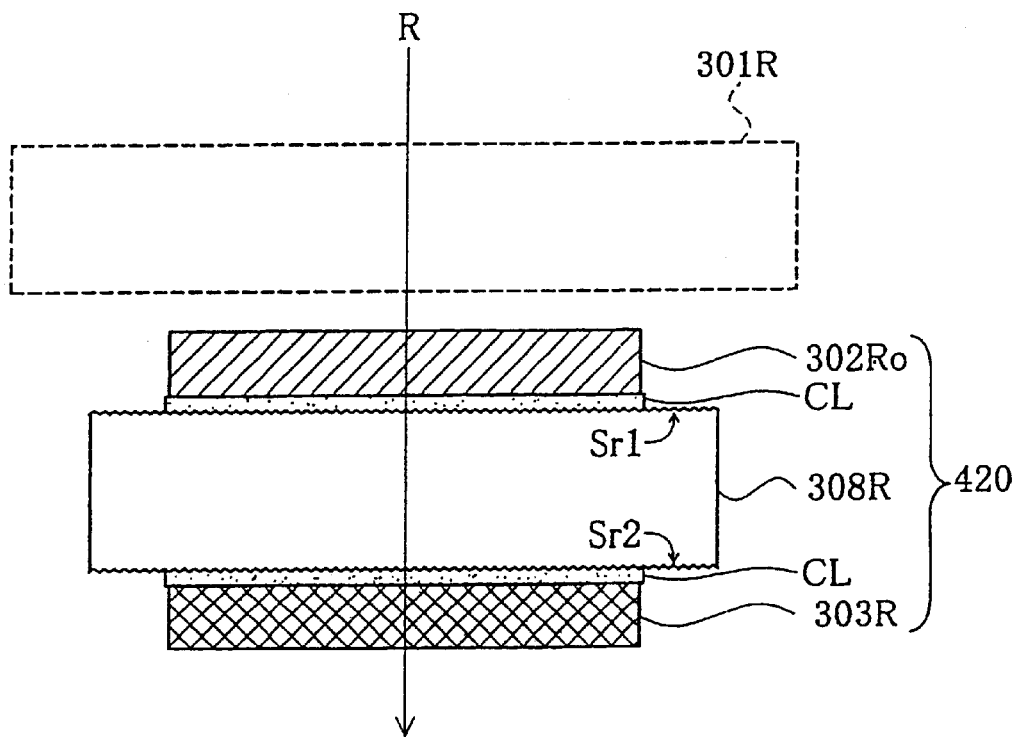

[FIG. 7]
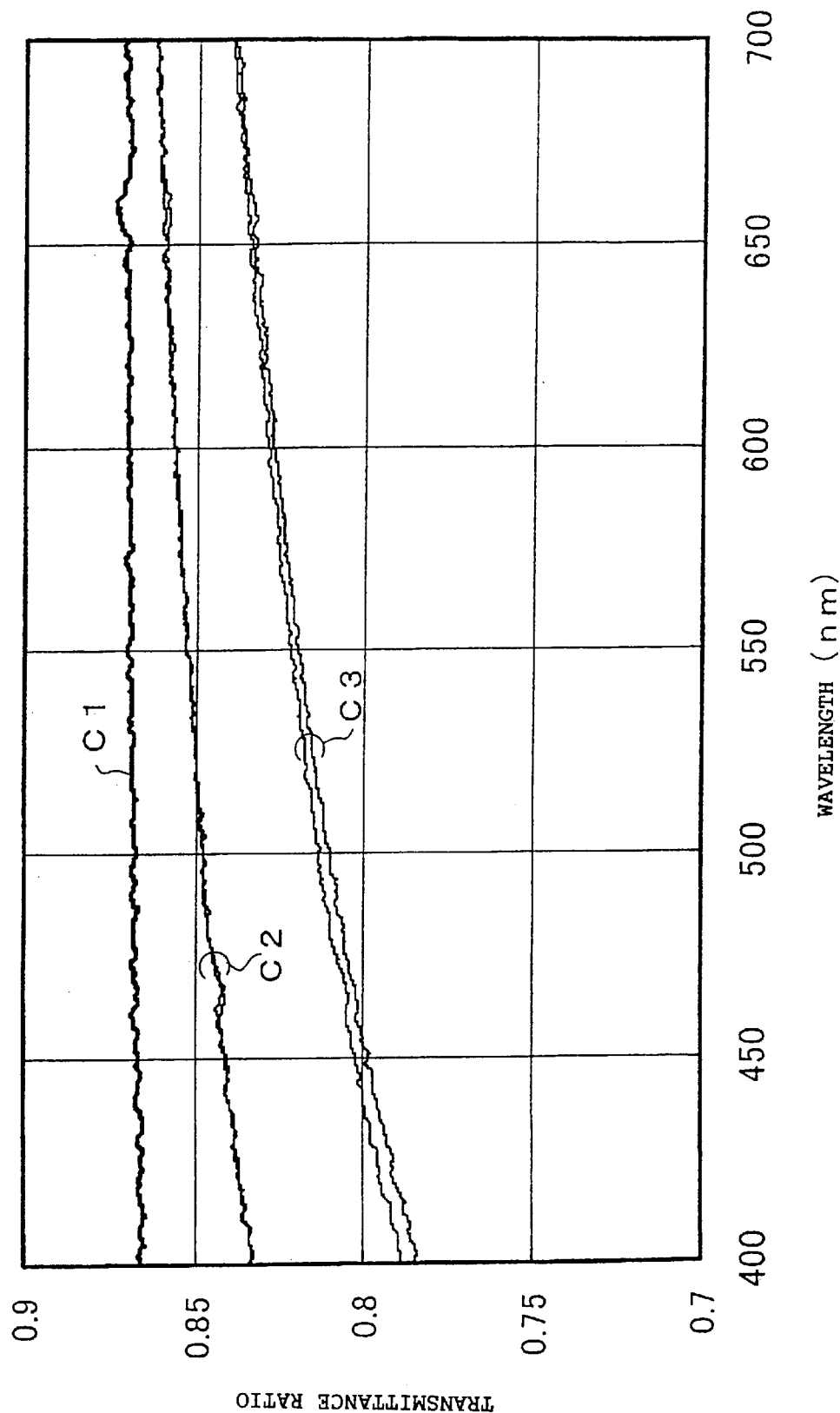

[FIG. 8]
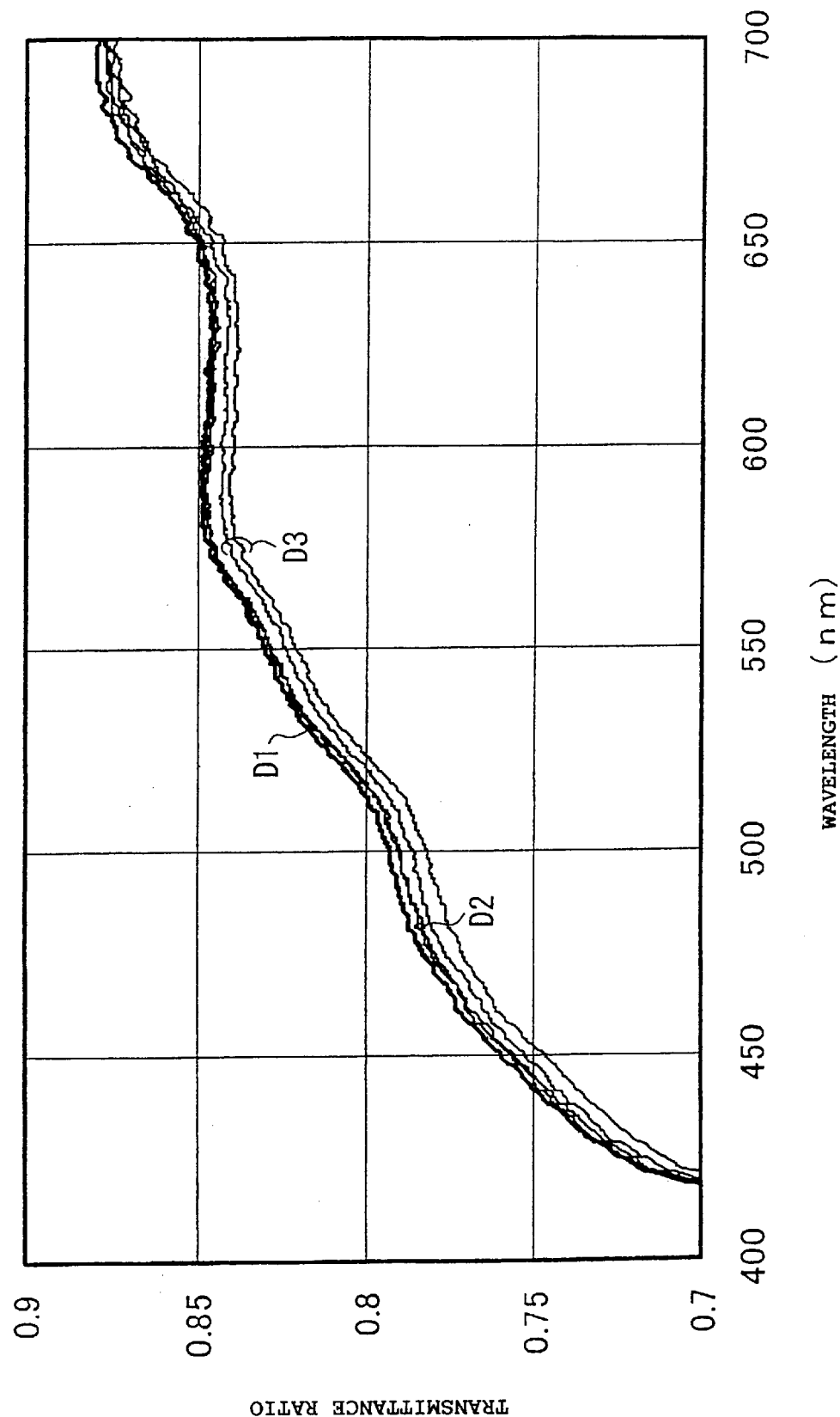

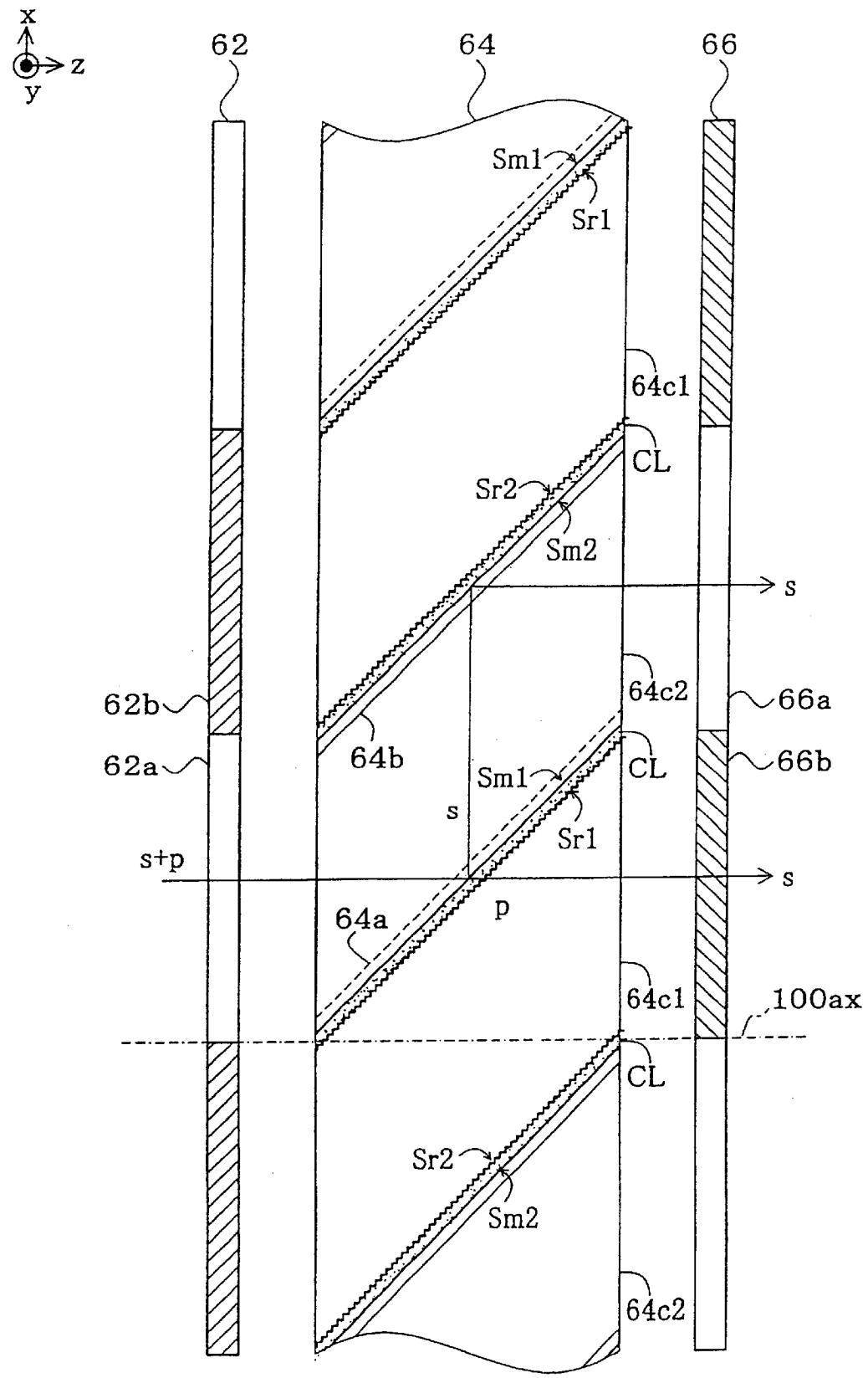
[FIG. 9]

[FIG. 10]
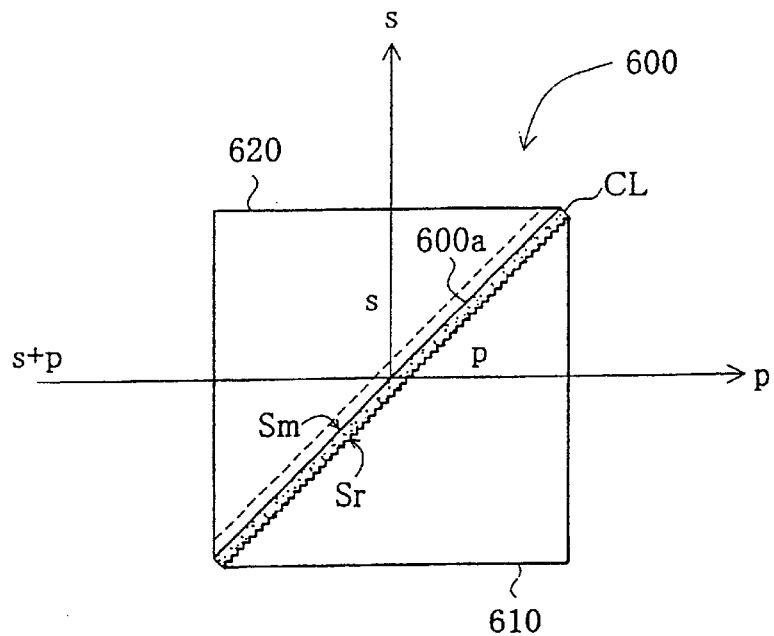
[FIG. 11]
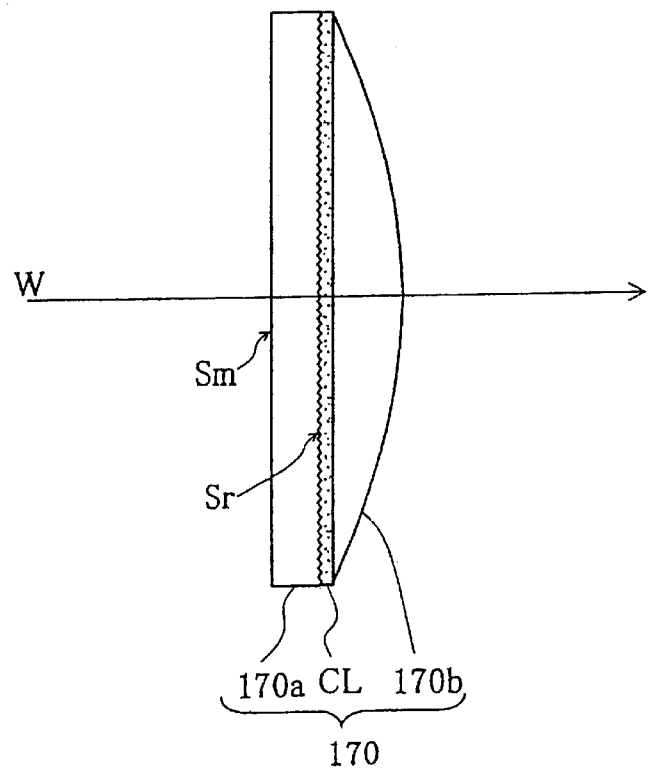

[FIG. 12]
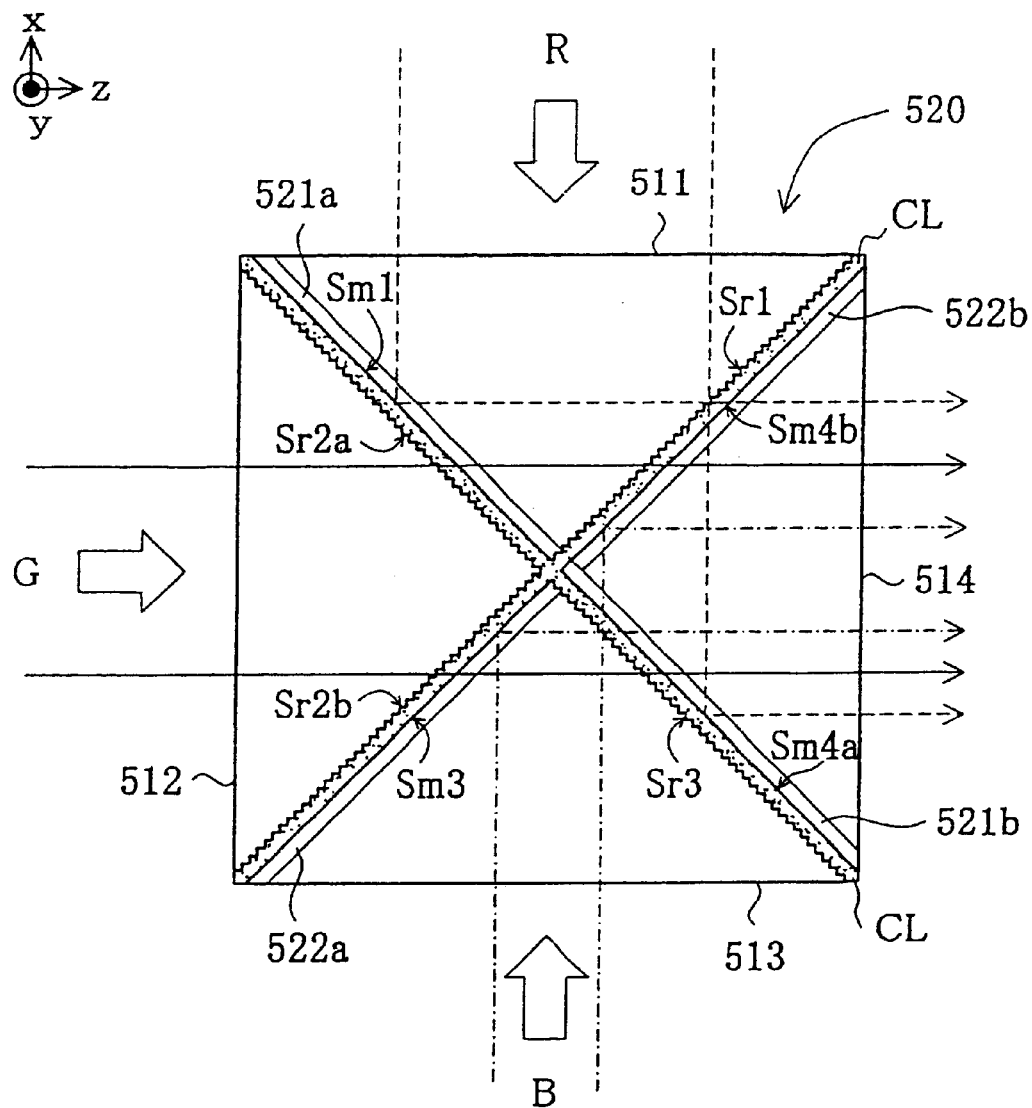

[FIG. 13]
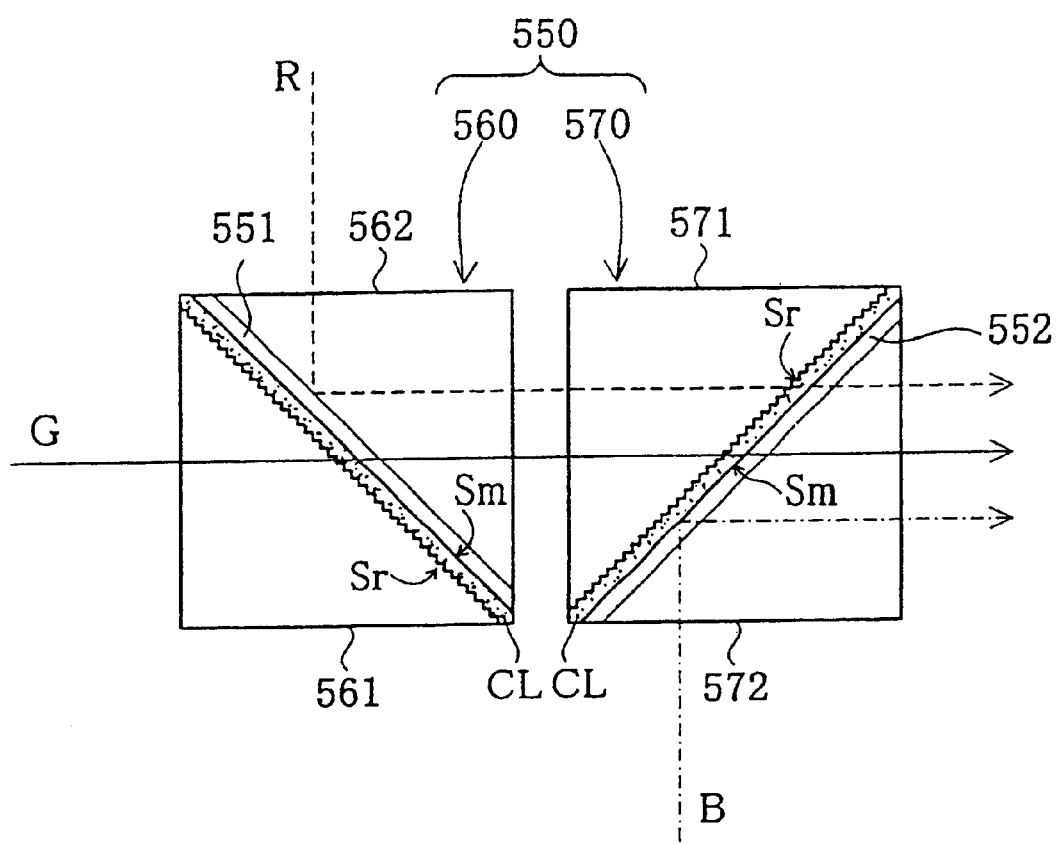

OPTICAL COMPONENT AND PROJECTOR USING THE SAME

BACKGROUND OF THE INVENTION

1. Field of Invention

The present invention relates to an optical component using glass, and a projector for projecting and displaying an image using the optical component.

2. Description of Related Art

In a projector, an image is displayed by modulating light which has exited from an illumination optical system using, for example, a liquid crystal light valve in accordance with image information (that is, an image signal), and by projecting the modulated light onto a screen.

The above-described projector includes various optical components using glass. For example, in the liquid crystal light valve, an optical component comprising a polarizer provided on a glass substrate is used. This optical component includes the polarizer and the glass substrate, with adhesive being used to affix the polarizer onto the glass substrate. In general, the surface of the substrate is finished to a mirror-smooth state in order to prevent scattering of light at the surface of the substrate.

However, it is troublesome to produce an optical component such as that described above. This is because, when the surface of the glass substrate is finished to a mirror-smooth state, it is usually necessary to perform grinding, lapping, and polishing for a long period of time. This problem also exists in various other types of optical components using glass.

In order to overcome the above-described conventional problem, it is an object of the present invention to provide a technology which makes it possible to easily produce an optical component without considerably deteriorating the optical characteristics of the optical component.

SUMMARY OF THE INVENTION

In order to solve at least a part of the above-described problem, in accordance with an exemplary embodiment of the present invention, there is provided an optical component which may consist of:

a glass substrate;

an optical member connected to the glass substrate; and a connecting layer for connecting a connecting surface of the glass substrate and a connecting surface of the optical member together.

According to this exemplary embodiment, the connecting surface of the glass substrate is defined as the surface which passes therethrough light which is processed by the optical component, and has a roughness of approximately 3 nm to approximately 10 nm in terms of the root mean square value.

In the optical component according to another exemplary embodiment, the connecting surface of the glass substrate is formed as a rough surface like that described above. However, the glass substrate and the optical member are connected together by covering the projections and depressions of the rough surface with the connecting layer. Accordingly, since the scattering of light at the rough surface can be reduced by the connecting layer, it is possible to easily produce the optical component without considerably deteriorating the optical characteristics of the optical component.

In the optical component according to another exemplary embodiment, it is preferable that the index of refraction of the connecting layer be approximately 1.2 to approximately 1.5.

When the index of refraction of the joining layer is in the above range, it is substantially the same as the index of refraction of the glass substrate, making it possible to reduce deterioration in the optical characteristics of the optical component.

In the optical component according to another exemplary embodiment, it is preferable that the ratio of the index of refraction of the joining layer to the index of refraction of the glass be from approximately 0.8 to approximately 1.2.

When the ratio of the index of refraction of the connecting layer to that of the glass substrate is in the above range, it is possible to considerably reduce deterioration in the optical characteristics of the optical component.

In the optical component according to another exemplary embodiment, the optical member may be a polarizer, or a retardation film, or a lens.

In the optical component according to another exemplary embodiment, the optical member may be a light-transmissive member which has a polarization separation film formed on the connecting surface thereof.

In the optical component according to another exemplary embodiment, the optical member may be a light-transmissive member which has a selection film for selecting light of a predetermined wavelength range formed on the joining surface thereof.

Accordingly, various optical components may be connected to the glass substrate.

In the optical component according to another exemplary embodiment, the glass substrate may be sapphire glass.

Since sapphire glass has a relatively high hardness, it is relatively difficult to finish the surface thereof to a mirror-smooth state. Therefore, an optical component which uses sapphire glass can be very easily produced.

In the optical component according to another exemplary embodiment, an antireflection film may be formed on a surface of the optical component which contacts the air and passes therethrough light which is processed by the optical component.

This makes it possible to prevent reflection at the surface which contacts the air and passes light therethrough, so that the optical characteristics of the optical component is improved.

In accordance with another exemplary embodiment of the present invention, there is provided an optical component which may consist of:

a plurality of first and second glass substrates alternately disposed along a predetermined direction;

connecting layers for connecting connecting surfaces of the first glass substrates and corresponding connecting surfaces of the second glass substrates; and polarization separation films and reflective films alternately disposed at interfaces between the first glass substrates and the corresponding second glass substrates;

In this exemplary embodiment, at the interfaces where the polarization separation films are formed, the connecting surfaces of the first glass substrates each have a roughness of approximately 3 nm to approximately 10 nm in root mean square value, the polarization separation films are formed on the corresponding second glass substrates, and the connecting layers are formed between the corresponding polarization separation films and the corresponding first glass substrates.

In the optical component according to this exemplary embodiment, the connecting surfaces of the corresponding first glass substrates are formed as rough surfaces. However, the first and second glass substrates are connected together by covering the projections and depressions of the rough surfaces with the corresponding connecting layers. Therefore, it is possible to easily produce the optical component without considerably deteriorating the optical characteristics of the optical component.

In accordance with another exemplary embodiment of the present invention, there is provided an optical component which may consist of:

four columnar glass prisms divided at interfaces forming into a substantially X shape; and connecting layers for connecting connecting surfaces of the four corresponding columnar glass prisms.

In this exemplary embodiment, at least two adjacent columnar glass prisms selected from the four columnar glass prisms are such that the joining surface of the first columnar glass prism has a roughness of approximately 3 nm to approximately 10 nm in root mean square value, the second columnar glass prism has a selection film for selecting light of a predetermined wavelength range formed thereon, and the connecting layer of the first columnar glass prism is formed between the selection film and the first columnar prism.

In the optical component according to another exemplary embodiment, the connecting surface of the selected first columnar glass prism is formed as a rough surface. However, the two columnar glass prisms are connected together by covering the projections and depressions of the rough surface with the joining layer. Therefore, the optical component can be easily produced without considerably deteriorating the optical characteristics of the optical component.

Various types of projectors may include the optical components of the present invention. For example, according to another exemplary embodiment of the present invention there may be provided a projector which may consist of:

an illumination optical system which causes an illumination light beam to exit therefrom;

an electro-optical device for modulating the light beam from the illumination optical system in accordance with image information; and a projection optical system for projecting the modulated light beam obtained by the electro-optical device.

The optical component of this exemplary embodiment is provided in any one of the illumination optical system, the electro-optical device, and the projection optical system.

According to another exemplary embodiment of the present invention, there may also be provided a projector which may consist of:

an illumination optical system which causes an illumination light beam to exit therefrom;

an electro-optical device for modulating the light beam from the illumination optical system in accordance with image information; and a projection optical system for projecting the modulated light beam obtained by the electrooptical device.

The illumination optical system of this exemplary embodiment may consist of:

a polarization generation section which causes a predetermined polarized light beam to exit therefrom, the polarization generation section may consist of an optical component for separating the light beam incident thereupon into two types of polarized light beams, and a selection retardation film for making one of the two types of polarized light beams which exit from the optical component the same as the other of the two types of polarized light beams.

According to another exemplary embodiment of this invention, there is provided a projector for projecting and displaying a color image, which may consist of:

an illumination optical system which causes an illumination light beam to exit therefrom;

a color light separation optical system for separating the illumination light beam which has exited from the illumination optical system into light beams of three color components, a first color light beam, a second color light beam, and a third color light beam;

a first electro-optical device, a second electro-optical device and a third electro-optical device for generating a first modulated light beam, second modulated light beam, and a third modulated light beam, respectively, as a result of modulating in accordance with image information the first color light beam, the second color light beam and the third color light beam separated by the color light separation optical system;

a color light synthesizing optical system for synthesizing the first modulated light beam, the second modulated light beam and the third modulated light beam; and a projection optical system for projecting the synthesized light beams which exit from the color light synthesizing optical system.

In this exemplary embodiment, an optical component is provided in any one of the illumination optical system, the color light separation optical system, the first electro-optical device, the second electro-optical device, the third electro-optical device, the color light synthesizing optical system, and the projection optical system.

According to another exemplary embodiment of this invention, there is provided a projector for projecting and displaying a color image, which may consist of:

an illumination optical system which causes an illumination light beam to exit therefrom;

a color light separation optical system for separating the illumination light beam which has exited from the illumination optical system into light beams having three color components, a first color light beam, a second light beam and a third color light beam;

a first electro-optical device, a second electro-optical device and a third electro-optical device for generating a first modulated light beam, a second modulated light beam and a third modulated light beam, respectively, as a result of modulating in accordance with image information the first color light beam, the second color light beam and the third color light beam separated by the color light separation optical system;

a color light synthesizing optical system for synthesizing the first modulated light beam, the second modulated light beam and the third modulated light beam; and a projection optical system for projecting the synthesized light beams which exit from the color light synthesizing optical system.

In this exemplary embodiment, the third optical component is provided in either one of the color light separation optical system and the color light synthesizing optical system.

Since these projectors include the above-described optical components, it is possible to easily produce these projectors without considerably deteriorating the optical characteristics of the projectors.

BRIEF DESCRIPTION OF THE DRAWINGS

FIG. 1 illustrates a projector to which the various exemplary embodiments of the present invention is applied.

FIG. 2 is an enlarged view of the illumination optical system shown in FIG. 1.

FIGS. 3A and 3B illustrate a polarization generation optical system.

FIG. 4 illustrates the main portion of the projector shown in FIG. 1.

FIG. 5 is an enlarged view of an optical component provided at the light-incident-surface side of a liquid crystal light valve shown in FIG. 4.

FIG. 6 is an enlarged view of an optical component provided at the light-exiting-surface side of a liquid crystal light valve shown in FIG. 4.

FIG. 7 illustrates a graph showing the transmittance ratios of pieces of sapphire glass having different surface roughness.

FIG. 8 illustrates a graph showing the transmittance ratios of optical components using pieces of sapphire glass having different surface roughness.

FIG. 9 is an enlarged view of a polarization beam splitter array provided in the illumination optical system shown in FIG. 2.

FIG. 10 illustrates a polarization beam splitter.

FIG. 11 is an enlarged view of a superimposing lens provided in the illumination optical system 100 shown in FIG. 2.

FIG. 12 is an enlarged view of a cross-dichroic prism provided in a color light synthesizing optical system shown in FIG. 4.

FIG. 13 illustrates a dichroic prism.

DETAILED DESCRIPTION OF PREFERRED EMBODIMENTS

A. Overall Structure of Projector

A description of various exemplary embodiments of the present invention will now be given. FIG. 1 illustrates a projector to which an exemplary embodiment of the present invention is applied. A projector 1000 includes an illumination optical system 100 including a light source device 120, a color light separation optical system 200, a relay optical system 220, three liquid crystal light valves 300R, 300G, and 300B, a cross-dichroic prism 520, and a projection lens 540.

As shown in FIG. 1, light beams from the illumination optical system 100 are separated into three color light beams, a red light beam (R), a green light beam (G), and a blue light beam (B) at the color light separation optical system 200. The separated color light beams are modulated by their corresponding liquid crystal light valves 300R, 300G, and 300B in accordance with image information. The modulated color light beams are each synthesized by the cross-dichroic prism 520 in order to project and display a color image onto a screen SC by the projection lens 540.

FIG. 2 is an enlarged view of the illumination optical system 100 shown in FIG. 1. The illumination optical system 100 includes the light source device 120, a first lens array 140 and a second lens array 150, a polarization generation optical system 160, and a superimposing lens 170. The light source device 120, the first lens array 140, and the second lens array 150 are disposed with reference to a light source optical axis 120ax, whereas the polarization generation optical system 160 and the superimposing lens 170 are disposed with reference to a system optical axis 100ax. The light source optical axis 120ax corresponds to the center axis of the light beam which exits from the light source device 120, whereas the system optical axis 100ax corresponds to the center axis of the light beam which exits from an optical element disposed behind the polarization generation optical system 160. As shown in FIG. 2, the system optical axis 100ax and the light source optical axis 120ax are disposed substantially parallel to each other so as to be displaced from each other by a displacement amount Dp in the x direction. This displacement amount Dp is described later. In FIG. 2, an illumination area LA which is illuminated by the illumination optical system 100 corresponds to the liquid crystal light valves 300R, 300G, and 300B.

The light source device 120 is capable of causing substantially parallel light beams to exit therefrom. The light source device 120 includes a light-emitting tube 122, a reflector 124 having a spheroidal concave surface, and a collimating lens 126. The light which has exited from the light-emitting tube 122 is reflected by the reflector 124, and the reflected light is converted by the collimating lens 126 into light which is substantially parallel to the light source optical axis 120ax. A light source device including a reflector having a paraboloid of revolution concave surface may also be used.

The first lens array 140 includes a plurality of small lenses 142 disposed in a matrix arrangement. Each of the small lenses 142 is a plano-convex lens, and has an external shape which is similar to that of the illumination area LA (that is, the liquid crystal light valves) when viewed from the z direction. The first lens array 140 divides the substantially parallel light beams which have exited from the light source device 120 into a plurality of partial light beams.

The second lens array 150 includes a plurality of small lenses 152 disposed in a matrix arrangement, with the small lenses 152 being the same type as the small lenses 142 of the first lens array 140. The second lens array 150 is capable of causing the center axis of each of the partial light beams that has exited from the first lens array 140 to become substantially parallel to the system optical axis 100ax; and causing the image of each small lens 142 of the first lens array 140 to be formed on the illumination area LA.

As shown in FIG. 2, the partial light beams which have exited from their corresponding small lenses 142 of the first lens array 140 are gathered and concentrated near the second lens array 150, that is, within the polarization generation optical system 160 through the second lens array 150.

FIGS. 3A and 3B illustrate the polarization generation optical system 160. FIG. 3A is a perspective view of the polarization generation optical system 160, whereas FIG. 3B is a portion of a plan view as seen from the +y directions. The polarization generation optical system 160 includes a light-shielding plate 62, a polarization beam splitter array 64, and a selection retardation film 66. The polarization generation optical system 160 corresponds to the polarization generation section in the present invention.

As shown in FIG. 3A, the polarization beam splitter array 64 is constructed by bonding a plurality of columnar glass substrates 64c which are substantially parallelogrammic in section.

Polarization separation films 64a and reflective films 64b are alternately formed at the interfaces of the glass substrates 64c. The polarization separation films 64a are dielectric multi-layered films, whereas the reflective films 64b are either dielectric multi-layered films or metallic films.

In the structure of the light-shielding plate 62, light-shielding surfaces 62b and open surfaces 62a are disposed in a striped arrangement. In the light-shielding plate 62, the light beams incident upon the light-shielding surfaces 62b are blocked, whereas the light beams incident upon the open surfaces 62a pass therethrough. The light-shielding surfaces 62*b* and the open surfaces 62*a* are disposed so that the partial light beams which have exited from the first lens array 140 (FIG. 2) are only incident upon the polarization separation films 64*a* of the polarization beam splitter array 64, and are not incident upon the reflective films 64*b*. More specifically, as shown in FIG. 3B, the centers of the open surfaces 62*a* of the light-shielding plate 62 are disposed so as to be substantially aligned with the centers of the polarization separation films 64*a* of the polarization beam splitter array 64. An open width Wp of each open surface 62*a* in the x direction is substantially equal to the size of each polarization separation film 64*a* in the x direction. Here, the light beams which have passed through the open surfaces 62*a* of the light-shielding plate 62 are only incident upon the polarization separation films 64*a*, and are not incident upon the reflective films 64*b*. The light-shielding plate 62 may consist of a flat, transparent member (such as a glass plate) having a light-shielding film (such as a chrome film, an aluminum film, or a dielectric multi-layered film) partly formed thereon. The light-shielding plate 62 may also consist of a light-shielding, flat plate, such as an aluminum plate, having open sections formed therein.

As shown by the solid line in FIG. 3B, the primary light beam (that is, the center axis) of each partial light beam which has exited from the first lens array 140 (FIG. 2) is incident upon its corresponding open surface 62*a* of the light-shielding plate 62 so as to be substantially parallel to the system optical axis 100*ax*. Each partial light beam which has passed through its corresponding open surface 62*a* is incident upon its corresponding polarization separation film 64*a*. Each polarization separation film 64*a* divides the corresponding incident partial light beam into an s-polarized partial light beam and a p-polarized partial light beam. Here, each p-polarized partial light beam passes through its corresponding polarization separation film 64*a*, whereas each s-polarized partial light beam is reflected by its corresponding polarization separation film 64*a*. Each s-polarized partial light beam reflected by its corresponding polarization separation film 64*a* travels towards its corresponding reflective film 64*b*, and is reflected thereby. Here, each p-polarized partial light beam which has passed through its corresponding polarization separation film 64*a*, and each s-polarized partial light beam reflected by its corresponding reflective film 64*b* are substantially parallel to each other.

The selection retardation film 66 is formed by open layers 66*a* and λ/2 phase layers 66*b*. The open layers 66*a* correspond to portions where the λ/2 phase layers 66*b* are not formed. The open layers 66*a* are capable of passing therethrough linearly polarized light beams incident thereupon. In contrast, the λ/2 phase layers 66*b* function as polarization conversion elements which convert linearly polarized light beams incident thereupon into linearly polarized light beams whose polarization directions are perpendicular to those of the incident linearly polarized light beams. In the embodiment, as shown in FIG. 3B, each p-polarized partial light beam which has passed through its corresponding polarization separation film 64*a* is incident upon its corresponding λ/2 phase layer 66*b*. Therefore, each p-polarized partial light beam is converted into an s-polarized partial light beam by its corresponding λ/2 phase layer 66*b*, and exits therefrom. On the other hand, each s-polarized partial light beam reflected by its corresponding reflective film 64*b* is incident upon its corresponding open layer 66*a*, so that it exits from its corresponding open layer 66*a* unchanged. In other words, the unpolarized partial light beams incident upon the polarization generation optical system 160 are converted into s-polarized partial light beams and exit therefrom. By disposing the λ/2 phase layers 66*b* only at the exiting surfaces of the s-polarized partial light beams reflected by their corresponding reflective films 64*b*, the partial light beams incident upon the polarization generation optical system 160 can also be converted into p-polarized partial light beams and be made to exit therefrom. In the selection retardation film 66, the λ/2 phase layers 66*b* may simply be bonded to the exiting surfaces of either the p-polarized partial light beams or the s-polarized partial light beams without forming anything at the locations where the open layers 66*a* are formed.

As shown in FIG. 3B, the centers of the two s-polarized light beams which exit from the polarization generation optical system 160 are displaced in the +x direction from the center of the unpolarized light beam (an s-polarized light beam+a p-polarized light beam) incident thereupon. The amount of displacement is equal to half a width Wp of the corresponding λ/2 phase layer 66*b* (that is, the size of the corresponding polarization separation film 64*a* in the x direction). Therefore, as shown in FIG. 2, the light source optical axis 120*ax* and the system optical axis 100*ax* are displaced from each other by a distance Dp equal to Wp/2.

The plurality of partial light beams which have exited from the first lens array 140 are, as described above, each divided into two partial light beams by the polarization generation optical system 160, and are converted into substantially one type of linearly polarized light beams whose polarization directions are the same. The plurality of partial light beams whose polarization directions are the same are superimposed upon the illumination area LA by the superimposing lens 170 shown in FIG. 2. Here, the distribution of the strength of the light which illuminates the illumination area LA is substantially uniform.

The illumination optical system 100 (FIG. 1) causes the illumination light (that is, s-polarized light beams) whose polarization directions are the same to exit therefrom in order to irradiate the liquid crystal light valves 300R, 300G, and 300B through the color light separation optical system 200 and the relay optical system 220.

The color light separation optical system 200 includes two dichroic mirrors 202 and 204, and a reflective mirror 208, and separates the light beams which exit from the illumination optical system 100 into the three color light beams, the red light beam, the green light beam, and the blue light beam. The first dichroic mirror 202 passes therethrough the red component of the light which has exited from the illumination optical system 100, and reflects the blue and green components. The red light beam R which has passed through the first dichroic mirror 202 is reflected by the reflective mirror 208 and exits therefrom towards the cross-dichroic prism 520. The red light beam R which has exited from the color light separation optical system 200 passes through a field lens 232 and reaches the liquid crystal light valve 300R for red light. The field lens 232 is capable of converting each partial light beam which has exited from the illumination optical system 100 into a light beam which is parallel to the center axis of the field lens 232. Field lenses 234 and 230 disposed adjacent to the light-incident surface of the liquid crystal light valve 300G and the light-incident surface of the liquid crystal light valve 300B, respectively, function similarly to the field lens 232.

Of the blue light beam B and the green light beam G reflected by the first dichroic mirror 202, the green light beam G is reflected by the second dichroic mirror 204 and exits from the color light separation optical system 200 towards the cross-dichroic prism 520. The green light beam G which has exited from the color light separation optical system 200 passes through the field lens 234, and reaches the liquid crystal light valve 300G for green light. On the other hand, the blue light beam B which has passed through the second dichroic mirror 204 exits from the color light separation optical system 200 and impinges upon the relay optical system 220.

The blue light beam B incident upon the relay optical system 220 passes through light-incident-side lens 222, a relay lens 226, reflective mirrors 224 and 228, and a light-exiting-side lens (that is, a field lens) 230 of the relay optical system 220 in order to reach the liquid crystal light valve 300B for blue light. The relay optical system 220 is used for the blue light beam B because the light path for the blue light beam B is longer than the light paths for the red light beam R and the green light beam G. By using the relay optical system 220, the blue light beam B incident upon the light-incident-side lens 222 can be transmitted to the light-exiting-side lens 230 unchanged.

In accordance with provided image information (that is, image signals), the three liquid crystal light valves 300R, 300G, and 300B modulate the three corresponding incident color light beams in order to generate modulated light beams. Each liquid crystal light valve includes a liquid crystal panel and polarizers disposed at the light-incident-surface side and the light-exiting-surface side of the liquid crystal panel, respectively. The liquid crystal light valves are described in more detail below.

The cross-dichroic prism 520 synthesizes the three color light beams which have passed through and which have been modulated by their corresponding liquid crystal light valves 300R, 300G, and 300B in order to produce synthesized light beams representing a color image. In the cross dichroic prism 520, a red light reflective film 521 and a blue light reflective film 522 are disposed so as to form a substantially X shape at the interfaces of four right-angled prisms. The red light reflective film 521 is a dielectric multi-layered film which reflects red light, while the blue light reflective film 522 is a dielectric multi-layered film which reflects blue light. The three color light beams are synthesized by the red light reflective film 521 and the blue light reflective film 522 in order to generate synthesized light beams representing a color image.

The synthesized light beams generated by the cross dichroic prism 520 exit towards the projection lens 540. The projection lens 540 projects the synthesized light beams which have exited from the cross-dichroic prism 520 onto the screen SC in order to display the color image thereon. The projection lens 540 may be a telecentric lens.

FIG. 4 illustrates the main portion of the projector 1000 shown in FIG. 1. In FIG. 4, the optical systems starting from the polarization generation optical system 160 up to the cross-dichroic prism 520, shown in FIG. 1, are illustrated, focusing attention on the polarization direction. Lenses and the like which are virtually unrelated to the polarization direction are not illustrated in FIG. 4.

As shown in FIG. 4, s-polarized light beams exit from the polarization generation optical system 160.

As described above, each s-polarized light beam is separated into a red light beam R, a green light beam G, and a blue light beam B by the two dichroic mirrors 202 and 204. In passing through the dichroic mirrors 202 and 204, the polarization direction does not change, so that the three color light beams remain as s-polarized light beams.

The red light beam R of each s-polarized light beam separated by the first dichroic mirror 202 is reflected by the reflective mirror 208 and impinges upon the first liquid crystal light valve 300R. The liquid crystal light valve 300R includes a liquid crystal panel 301R and two polarizers (that is, first and second polarizers) 302Ri and 302Ro disposed at the light-incident-surface side and the light-exiting-surface side of the liquid crystal panel 301R, respectively. A $\lambda/2$ phase film 303R is provided at the light-exiting-surface side of the liquid crystal panel 301R.

The first polarizer 302Ri is bonded to a first glass substrate 307R, while the second polarizer 302Ro and the $\lambda/2$ phase film 303R are bonded to a second glass substrate 308R. The polarization axes of the first and second polarizers 302Ri and 302Ro intersect at right angles to each other. The first polarizer 302Ri transmits s-polarized light beams therethrough, whereas the second polarizer 302Ro transmits p-polarized light beams therethrough.

The s-polarized light beams incident upon the first liquid crystal light valve 300R pass through the first glass substrate 307R and the first polarizer 302Ri for transmitting s-polarized light beams unchanged, and impinge upon the liquid crystal panel 301R. The liquid crystal panel 301R converts some of the s-polarized light beams incident thereupon into p-polarized light beams, and only the p-polarized light beams exit from the second polarizer 302Ro for transmitting p-polarized light beams disposed adjacent to the light-exiting-surface of the liquid crystal panel 301R. The p-polarized light beams which have exited from the second polarizer 302Ro for transmitting p-polarized light beams impinge upon the $\lambda/2$ phase film 303R through the second glass substrate 308R, and are converted into s-polarized light beams by the $\lambda/2$ phase film 303R, after which the converted s-polarized light beams exit from the $\lambda/2$ phase film 303R.

The green light beam G of each s-polarized light beam separated by the second dichroic mirror 204 impinges upon the second liquid crystal light valve 300G. The second liquid crystal light valve 300G includes a liquid crystal panel 301G, a first polarizer 302Gi for transmitting s-polarized light beams disposed adjacent to the light-incident surface of the liquid crystal panel 301G, and a second polarizer 302Go for transmitting p-polarized light beams disposed adjacent to the light-exiting surface of the liquid crystal panel 301G. The first polarizer 302Gi and the second polarizer 302Go are bonded to a first glass substrate 307G and a second glass substrate 308G, respectively. The green light beam G of each s-polarized light beam incident upon the second liquid crystal light valve 300G passes through the first glass substrate 307G and the first polarizer 302Gi for transmitting s-polarized light beams unchanged, and impinges upon the liquid crystal panel 301G.

The liquid crystal panel 301G converts some of the s-polarized light beams incident thereupon into p-polarized light beams, and only the p-polarized light beams exit from the second polarizer 302Go for transmitting p-polarized light beams disposed adjacent to the light-exiting surface of the liquid crystal panel 301G. The p-polarized light beams which have exited from the second polarizer 302Go for transmitting p-polarized light beams pass through the second glass substrate 308G.

The blue light beam B of each s-polarized light beam separated by the second dichroic mirror 204 is reflected by the two reflective mirrors 224 and 228, and impinges upon the third liquid crystal light valve 300B. The third liquid crystal light valve 300B includes a liquid crystal panel 301B, two polarizers (that is, first and second polarizers) 302Bi and 302Bo, a $\lambda/2$ phase film 303B, a first glass substrate 307B to which the first polarizer 302Bi is bonded, and a second glass substrate 308B to which the second polarizer 302Bo and the $\lambda/2$ phase film 303B are bonded. The structure of the third liquid crystal light valve 300B is the same as the structure of the first liquid crystal light valve 300R.

In the three first, second and third liquid crystal light valves 300R, 300G, and 300B used in the embodiment, the first polarizers 302Ri, 302Gi, and 302Bi for transmitting s-polarized light beams are disposed at the light-incident surface sides of the three corresponding liquid crystal light valves 300R, 300G, and 300B, whereas the corresponding second polarizers 302Ro, 302Go, and 302Bo for transmitting p-polarized light beams are disposed at the light-exiting surface sides of the three corresponding liquid crystal light valves 300R, 300G, and 300B. Here, the liquid crystal alignment states of the liquid crystal panels 301R, 301G, and 301B are the same.

In the embodiment, the first and third liquid crystal light valves 300R and 300B are constructed so that the light beams exiting therefrom are s-polarized light beams, whereas the second liquid crystal light valve 300G is constructed so that the light beams exiting therefrom are p-polarized light beams, in order to increase the efficiency with which the cross-dichroic prism 520 uses light. More specifically, the two reflective films 521 and 522 formed at the cross-dichroic prism 520 reflect s-polarized light beams better than p-polarized light beams, but transmit p-polarized light beams better than s-polarized light beams. Therefore, the two red and blue light reflective films 521 and 522 are made to reflect s-polarized light beams, and to transmit p-polarized light beams therethrough.

As can be understood from the foregoing description, the first to third liquid crystal light valves 300R, 300G, and 300B used in the embodiment correspond to first to third electro-optical devices used in the present invention. In general, although the term electro-optical device used in a narrow sense only refers to the liquid crystal panel of a liquid crystal light valve, in the specification the term electro-optical device is used in a wider sense to refer not only to the liquid crystal panel but also to the polarizers, the λ/2 phase plate, and the like.

B. Optical Component (1)

FIG. 5 is an enlarged view of an optical component provided at the light-incident-surface side of the first liquid crystal light valve 300R (FIG. 4). An optical component 410 includes the first polarizer 302Ri and the first glass substrate 307R which holds the first polarizer 302Ri. The first polarizer 302Ri and the first glass substrate 307R are connected together at their connecting surfaces by a connecting layer CL. Antireflection films (not shown) for preventing reflection of light at the interfaces are formed on the surfaces of the optical component 410 which contact air and which pass light which is processed by the optical component 410, that is, the light-incident surface of the first glass substrate 307R which passes red light R therethrough and the light-exiting surface of the first polarizer 302Ri.

As shown in exaggerated form in FIG. 5, one surface Sm of the first glass substrate 307R is a specular surface, while the other surface Sr thereof is a rough surface or a connecting surface which is connected to the first polarizer 302Ri. As mentioned above, in general, a surface of a glass substrate is finished to mirror-smooth state in order to minimize scattering of light. The specular surface of the glass substrate is usually formed by grinding, lapping, and polishing.

However, the time required to polish a glass substrate is usually the same as the time required to lap glass. Therefore, it is very troublesome to finish a glass substrate into a mirror-smooth state. In the optical component 410 shown in FIG. 5, the first glass substrate 307R is used without polishing the joining surface of the first glass substrate 307R. Therefore, the optical component 410 can be easily produced.

In general, grinding is a relatively rough smoothing process for forming glass into a predetermined shape with predetermined dimensions, and uses a grindstone such as diamond. Lapping is a smoothing process for improving the finished state of the surface of the glass substrate that has been ground, and uses abrasive grains such as alumina, silicon carbide, or diamond grains. Polishing is a smoothing process for producing a high mirror-finished surface of a glass substrate. Grains which are finer than the abrasive grains used in the lapping process, such as cerium oxide grains or colloidal silica grains, are used.

After the lapping process, the roughness of the surface of the glass substrate, though depending on the abrasive grains used in the lapping process, is usually in a range of approximately 3 nm to approximately 10 nm in terms of the rms (root mean square) value. On the other hand, after the polishing process, the roughness of the surface of the glass substrate is usually in a range of approximately 1 nm to approximately 2 nm in terms of the rms value. The roughness of the surface of the glass substrate can be measured using, for example, a non-contact, optical-surface-roughness measuring device. WYKO NT-2000 (produced by VEECO) may be used for the non-contact, optical-surface-roughness measuring device. In general, it is possible to confirm with the naked eye whether any scattering of light at the surface of the glass substrate after the lapping process. However, it is difficult to confirm with the naked eye any scattering of light at the surface of the glass substrate after the polishing process.

In the specification, rough surface refers to a surface obtained after the lapping process, with a roughness of approximately 3 nm to approximately 10 nm in terms of the rms value. Specular surface refers to a surface after the polishing process, with a roughness of approximately 1 nm to approximately 2 nm in terms of the rms value.

As mentioned above, in the first glass substrate 307R shown in FIG. 5, the first surface Sm is a specular surface that has been polished, whereas the second surface Sr is a rough surface that has been lapped. The rough surface Sr of the first glass substrate 307R is a joining surface which is connected to the first polarizer 302Ri. The first glass substrate 307R and the first polarizer 302Ri are connected together by covering the projections and depressions of the rough surface Sr of the first glass substrate 307R with the connecting layer CL. It is preferable that the index of refraction of the joining layer CL be substantially the same as the index of refraction of the first glass substrate 307R. A material having an index of refraction of approximately 1.2 to approximately 1.5 is actually used.

Here, the first glass substrate 307R and the connecting layer CL may be considered as an integrally structured glass substrate. In this case, scattering of light at the rough surface Sr of the first glass substrate 307R virtually does not occur, so that the first glass substrate 307R exhibits optical characteristics that are substantially the same as those of a glass substrate finished to a mirror-smooth state. It is preferable that the index of refraction of the connecting layer CL be such that the ratio of the index of refraction of the connecting layer CL to that of the glass substrate be in a range of approximately 0.8 to approximately 1.2. In this way, the first glass substrate 307R can exhibit optical characteristics which are very close to those of a glass substrate finished to a mirror-smooth state.

Adhesives, glue, and the like, may be used for the connecting layer CL having an index of refraction of approximately 1.2 to approximately 1.5. When a separate device for affixing the first glass substrate 307R and the first polarizer 302Ri together is used for the connecting operation, gel, sol, a liquid, or the like, may be used. For example, PHOTO bond 150 (produced by Sunrise MSI) may be used for the connecting layer CL. The adhesive has an index of refraction of approximately 1.464 before curing, and an index of refraction of approximately 1.502 after curing.

FIG. 6 is an enlarged view of an optical component provided at the light-exiting-surface side of the first liquid crystal light valve 300R (FIG. 4). An optical component 420 includes the second polarizer 302Ro, the λ/2 phase film 303R, and the second glass substrate 308R which holds the second polarizer 302Ro and the λ/2 phase film 303R. The second polarizer 302Ro and the second glass substrate 308R, and the λ/2 phase film 303R and the second glass substrate 308R are connected together at their corresponding connecting surfaces by corresponding connecting layers CL. Antireflection films (not shown) for preventing reflection of light at the interfaces are formed on the surfaces of the optical component 420 which contact air and pass light which is processed by the optical component 420, that is, the light-incident surface of the second polarizer 302Ro and the light-exiting surface of the λ/2 phase film 303R, both of which surfaces pass red light R therethrough.

In the second glass substrate 308R shown in FIG. 6, a first surface Sr1 and a second surface Sr2 are formed as rough surfaces by lapping. The first rough surface Sr1 of the glass substrate 308R is connected to the second polarizer 302Ro, whereas the second rough surface Sr2 is connected to the λ/2 phase film 303R. Even in the optical component 420, the second polarizer 302Ro and the second glass substrate 308R, and the λ/2 phase film 303R and the second glass substrate 308R are connected together, respectively, by covering the projections and depressions of their corresponding first and second rough surfaces Sr1 and Sr2 of the second glass substrate 308R with their corresponding connecting layers CL. This can considerably reduce scattering of light at the rough surfaces of the second glass substrate 308R, so that the second glass substrate 308R can exhibit optical characteristics which are substantially the same as those of a glass substrate which finished to a mirror-smooth state.

Sapphire glass is used for the first and second glass substrates 307R and 308R shown in FIGS. 5 and 6, respectively. Since sapphire glass is relatively hard, it is relatively difficult to finish sapphire glass to a mirror-smooth state. Therefore, when sapphire glass is used for the first and second glass substrates 307R and 308R as in the embodiment, it is particularly advantageous to apply the present invention. White sheet glass may be used instead of sapphire glass.

FIG. 7 illustrates a graph showing the transmittance ratios of sapphire glass substrates having different surface roughness. The graph shows the transmittance ratios obtained when the sapphire glass substrates alone are disposed between a light source and a light-intensity measuring device. The transmittance ratios are measured with reference to the light intensity obtained when nothing is disposed between the light source and the light-intensity measuring device. Antireflection films are not formed on the surfaces of the sapphire glass substrates used in this experiment.

A curve C1 indicates the transmittance ratio of a conventionally used sapphire glass substrate, that is, a sapphire glass substrate having both surfaces polished. A curve C2 indicates the transmittance ratios of sapphire glass substrates having both surfaces subjected to a first type of lapping operation.

A curve C3 indicates the transmittance ratios of sapphire glass substrates having both surfaces subjected to a second type of lapping operation. For each of the curves C2 and C3, two samples are used.

The roughness of the surfaces of the sapphire glass substrate (curve C1) which have been polished are approximately 1.8 nm in terms of the rms values. The roughness of the surfaces of the sapphire glass substrates (curve C2) which have been subjected to the first type of lapping operation are approximately 3.4 nm in terms of the rms values. The roughness of the surfaces of the sapphire glass substrates (curve C3) which have been subjected to the second type of lapping operation are approximately 7.6 nm in terms of the rms values. In the first type of lapping operation, abrasive grains which are finer than those used in the second type of lapping operation are used.

As can be seen from the graph shown in FIG. 7, the transmittance ratios of the sapphire glass substrates (curve C2) having both surfaces subjected to the first type of lapping operation and the transmittance ratios of the sapphire glass substrates (curve C3) having both surfaces subjected to the second type of lapping operation are considerably smaller than the transmittance ratio of the sapphire glass substrate (curve C1) having both surfaces polished. More specifically, the transmittance ratios of light of approximately 550 nm of the sapphire glass substrates (curve C3) having both surfaces subjected to the second type of lapping operation are approximately 5% smaller than that of the sapphire glass substrate (curve C1) having both surfaces polished. This is because light is scattered at the rough surfaces that have been lapped.

FIG. 8 illustrates a graph of the transmittance ratios of optical components using sapphire glass substrates having different surface roughness. Like the optical component shown in FIG. 6, the optical components used in this experiment each may consist of a λ/2 phase film and a polarizer bonded to a sapphire glass substrate through a joining layer. Antireflection films are formed on the light-incident surface and the light-exiting surface of each optical component. In the graph shown in FIG. 8, the transmittance ratios are obtained when the optical components are disposed between a light-intensity measuring device and an illuminating device from which linearly polarized light beams exit. The transmittance ratios are measured with reference to the intensity of light when nothing is disposed between the illuminating device and the light-intensity measuring device.

The optical components are disposed so that almost all of the linearly polarized light beams which have exited from the illuminating device pass through their corresponding polarizers. The light beams which exit from the λ/2 phase films are all detected by the light-intensity measuring device regardless of the polarization states.

A curve D1 indicates the transmittance ratio of an optical component using a sapphire glass substrate having both surfaces polished, and corresponds to the curve C1. A curve D2 indicates the transmittance ratio of an optical component using the sapphire glass substrate having both surfaces subjected to the first type of lapping operation, and corresponds to the curve C2. A curve D3 indicates the transmittance ratio of an optical component using the sapphire glass substrates having both surfaces subjected to the second type of lapping operation, and corresponds to the curve C3.

As can be seen from FIG. 8, the transmittance ratio of the optical component (curve D2) using the sapphire glass substrate having both surfaces subjected to the first type of lapping operation and the transmittance ratio of the optical component (curve D3) using the sapphire glass substrate having both surfaces subjected to the second type of lapping operation are substantially the same as the transmittance ratio of the optical component (curve D1) using the sapphire glass substrate having both surfaces polished. More specifically, the transmittance ratio of light of approximately 550 nm of the optical component (curve D3) using the sapphire glass substrate having both surfaces subjected to the second type of lapping operation is only approximately 1% less than that of the optical component (curve D1) using the sapphire glass substrate having both surfaces polished. This is because scattering of light at the rough surfaces which have been lapped is reduced by the corresponding connecting layers.

From the graphs illustrated in FIGS. 7 and 8, it can be seen that the optical component 420 shown in FIG. 6 including the sapphire glass substrate 308R having rough surfaces provides substantially the same optical characteristics as those provided when a sapphire glass substrate having only specular surfaces is used.

In the case where a sapphire glass substrate is used, when at least one of the connecting surfaces is a rough surface such as the two rough surfaces of a sapphire glass substrate which has been subjected to the same type of lapping and which has a light transmittance ratio of approximately 0.8 (80%) when the wavelength is 550 nm, it is possible to obtain substantially the same optical characteristics as those when a sapphire substrate both of whose surfaces are specular surfaces are used.

As can be understood from the foregoing description, the connecting surface of the first glass substrate 307R of the optical component 410 shown in FIG. 5 and the connecting surfaces of the second glass substrate 308R of the optical component 420 shown in FIG. 6 pass light to be processed by the corresponding optical components 410 and 420. They have surface roughness of approximately 3 nm to approximately 10 nm in terms of the corresponding rms values. The first glass substrate 307R is connected to the first polarizer 302Ri by the connecting layer CL, while the second glass substrate 308R is connected to the second polarizer 302Ro and the λ/2 phase film 303R by the corresponding connecting layers CL. This makes it possible to easily produce the optical components 410 and 420 without significantly deteriorating the optical characteristics of the optical components 410 and 420.

In the optical component 410 shown in FIG. 5, the first polarizer 302Ri corresponds to an optical member used in the present invention. In the optical component 420 shown in FIG. 6, the second polarizer 302Ro and the λ/2 phase film 303R correspond to optical members used in the present invention.

C. Optical Component (2)

FIG. 9 is an enlarged view of the optical component, that is, the polarization beam splitter array 64 of the illumination optical system 100 (FIG. 2). FIG. 9 is an enlarged view of FIG. 3B, in which the light-shielding film 62 and the selection retardation film 66 are separated from each other in order to make clear how FIG. 3B corresponds with FIG. 9.

As shown in FIG. 9, the polarization beam splitter array 64 is constructed by bonding a plurality of columnar glass substrates which are substantially parallelogrammic in section. The polarization separation films 64a and the reflective films 64b are alternately disposed at the interfaces of the glass substrates. More specifically, as shown in FIG. 9, a plurality of first glass substrates 64c1 and a plurality of second glass substrates 64c2 are alternately disposed in the x direction. The first glass substrates 64c1 and the corresponding second glass substrates 64c2 are bonded together by corresponding connecting layers CL. In the optical component 64, antireflection films (not shown) for preventing reflection of light are formed on the surfaces thereof which contact air and pass therethrough light which is processed by the polarization beam splitter array 64, that is, the light-incident surface and the light-exiting surface of each second glass substrate 64c2 which pass an unpolarized light beam (an s-polarized light beam+a p-polarized light beam) and an s-polarized light beam, respectively. Antireflection films may also be formed on the light-incident surface and the light-exiting surface of each first glass substrate 64c1.

The first glass substrates 64c1 have two rough surfaces which correspond to lapped connecting surfaces Sr1 and Sr2 which are connected to the corresponding second glass substrates 64c2 disposed in the ±x directions.

On the other hand, the second glass substrates 64c2 have two specular surfaces which are polished connecting surfaces Sm1 and Sm2 which are connected to the corresponding first glass substrates 64c1 disposed in the ±x directions. The polarization separation films 64a and the reflective films 64b are formed, respectively, on the two specular surfaces Sm1 and Sm2 of their corresponding second glass substrates 64c2.

An unpolarized light beam (an s-polarized light beam+a p-polarized light beam) incident upon its corresponding second glass substrate 64c2 impinges upon its corresponding polarization separation film 64a formed on its corresponding second glass substrate 64c2, and is separated into an s-polarized light beam and a p-polarized light beam. Here, each s-polarized light beam is reflected by its corresponding polarization separation film 64a formed on the specular surface Sm1 of its corresponding second glass substrate 64c2, so that each s-polarized light beam is not affected by the corresponding rough surface Sr1 of its corresponding first glass substrate 64c1. On the other hand, each p-polarized light beam passes through its corresponding polarization separation film 64a and through the rough surface Sr1 of its corresponding first glass substrate 64c1 to exit it. Each p-polarized light beam is virtually not scattered by its corresponding rough surface Sr1 due to its corresponding connecting layer CL. On the other hand, each s-polarized light beam reflected by its corresponding polarization separation film 64a is reflected by its corresponding reflective film 64b formed on the specular surface Sm2 of its corresponding second glass substrate 64c2, so that each s-polarized light beam is unaffected by the corresponding rough surface Sr2 of its corresponding first glass substrate 64c1 disposed in the ±x directions.

In the optical component, that is, the polarization beam splitter array 64 shown in FIG. 9, at the interfaces where the corresponding polarization separations film 64a are formed, the connecting surfaces of the first glass substrates 64c1 have roughness of approximately 3 nm to approximately 10 nm in terms of their corresponding rms values. The polarization separation films 64a are formed on their corresponding second glass substrates 64c2. At the interfaces where their corresponding polarization separation films 64a are formed, the corresponding first and second glass substrates 64c1 and 64c2 are connected together by the connecting layers CL corresponding thereto. By constructing the polarization beam splitter array 64 in the above-described manner, it is possible to easily produce the polarization beam splitter array 64 without considerably deteriorating the optical characteristics of the polarization beam splitter array 64.

In FIG. 9, at each interface where its corresponding reflective film 64b is formed, the second connecting surface Sr2 of each first glass substrate 64c1 is rough like each first connecting surface Sr1. However, since light does not pass through any of the second connecting surfaces Sr2, each second connecting surface Sr2 may be made more rough.

In FIG. 9, although the polarization beam splitter array 64 incorporated in the projector 1000 is illustrated, the present invention may also be applied to a polarization beam splitter.

FIG. 10 illustrates a polarization beam splitter. An optical component such as a polarization beam splitter 600 may consist of two substantially triangular-prism-shaped transmissive members 610 and 620. The first transmissive member 610 and the second transmissive member 620 are connected together at their connecting surfaces by a connecting layer CL, and are formed of glass. An antireflection film (not shown) for preventing reflection of light at the interface is formed on the surface of the polarization beam splitter 600 which contacts air and which passes light which is processed by the polarization beam splitter 600.

The first transmissive member 610 has a rough surface which corresponds to a lapped connecting surface Sr which is connected to the second transmissive member 620. On the other hand, the second transmissive member 620 has a specular surface which is a polished connecting surface Sm which is joined to the first transmissive member 610. A polarization separation film 600a is formed on the specular surface Sm.

The polarization beam splitter 600 corresponds to a portion of the optical component 64 shown in FIG. 9 that has been cut away. In other words, one block of the optical component 64 shown in FIG. 9 including a polarization separation film 64a formed at an interface between a first glass substrate 64c1 and a second glass substrate 64c2 shown in FIG. 9 corresponds to the optical component 600 shown in FIG. 10. Therefore, as in the optical component 64 shown in FIG. 9, the p-polarized light beam separated at the polarization separation film 600a is virtually not scattered as it passes through the rough surface Sr which is the connecting surface of the first transmissive member 610.

In the optical component, that is, the polarization beam splitter 600 shown in FIG. 10, the connecting surface of the first transmissive member 610 is defined as the surface which passes light which is processed by the optical component, has a roughness of approximately 3 nm to approximately 10 nm in terms of the rms value, and is connected to the second transmissive member 620 having the polarization separation film formed thereon by the connecting layer CL. This makes it possible to easily produce the optical component 600 without considerably deteriorating the optical characteristics of the optical component 600. The second transmissive member 620 having the polarization separation film 600a formed thereon corresponds to an optical member used in the present invention.

D. Optical Component (3)

FIG. 11 is an enlarged view of an optical component such as the superimposing lens 170 provided in the illumination optical system 100 shown in FIG. 2. The superimposing lens 170 includes a glass substrate 170a and a lens 170b, which are connected together by a connecting layer CL. An antireflection film (not shown) for preventing reflection of light at an interface is formed on a surface of the superimposing lens 170 which passes light W which is processed by the superimposing lens 170.

The lens 170b is a piano-convex lens formed of resin, with the convex surface being aspherical. The lens 170b is formed of resin because it is relatively easy to form the lens 170b into an aspherical shape when resin is used.

The glass substrate 170a is a specular surface which corresponds to a polished first surface Sm, and a rough surface which corresponds to a lapped second surface Sr. The rough surface Sr of the glass substrate 170a corresponds to the connecting surface with the lens 170b. The glass substrate 170a and the lens 170b are connected together by covering the projections and depressions of the rough surface Sr of the glass substrate 170a with the connecting layer CL. This substantially prevents light from being scattered at the rough surface Sr of the glass substrate 170a.

In the optical component, that is, the superimposing lens 170 shown in FIG. 11, the connecting surface of the glass substrate 170a is defined as the surface which passes light which is processed by the optical component, has a roughness of from approximately 3 nm to approximately 10 nm in terms of the rms value, and is connected to the lens 170b by the connecting layer CL. This makes it possible to easily produce the superimposing lens 170 without considerably deteriorating the optical characteristics of the superimposing lens 170. In the superimposing lens 170 shown in FIG. 11, the lens 170b corresponds to an optical member in the present invention.

The lens 170b and the connecting layer CL may be integrally formed. In other words, the lens 170b may be directly molded onto the glass substrate 170a using resin. Such an optical component can be molded by disposing, for example, a mold for molding the lens onto the glass substrate 170a, and pouring ultraviolet curing resin into the mold. Thereafter, the resin is irradiated with ultraviolet rays and hardened. In this case, the resin functions as the lens 170b and the connecting layer CL used in the present invention.

In FIG. 11, the present invention is described as being applied to the superimposing lens 170 of the illumination optical system 100 shown in FIG. 2. However, the present invention may be applied to other lenses of the illumination optical system 100, such as the first lens array 140 and the second lens array 150. In addition, the present invention may be applied to the projection lens 540 provided in the projection optical system (FIG. 1).

E. Optical Component (4)

FIG. 12 is an enlarged view of an optical component such as the cross-dichroic prism 520 provided in the color light synthesizing optical system shown in FIG. 4. As mentioned above, the red light reflective film 521 and the blue light reflective film 522 are formed in the cross-dichroic prism 520 so as to form a substantially X shape at the interfaces of the four right-angled prisms. More specifically, the cross-dichroic prism 520 includes four right-angled prisms 511 to 514 divided at the interfaces which form a substantially X shape, and connecting layers CL for connecting the four right-angled prisms at their connecting surfaces. In the cross-dichroic prism 520 shown in FIG. 12, the first to fourth columnar prisms 511 to 514 are formed of glass. In the cross-dichroic prism 520, an antireflection film (not shown) for preventing reflection of light at the interfaces are formed on the surfaces which contact the air and which pass light, that is, red light R, green light G, and blue light B which are processed by the cross-dichroic prism 520.

The first prism 511 is disposed adjacent to the second prism 512 and the fourth prism 514. It has a specular surface Sm1 which is a connecting surface connected to the second prism 512, and a rough surface Sr1 which is a connecting surface connected to the fourth prism 514. A first red light reflective film 521a for reflecting red light R is formed on the specular surface Sm1.

The second prism 512 is disposed adjacent to the first prism 511 and the third prism 513, and has a first rough surface Sr2a and a second rough surface Sr2b, which are connecting surfaces.

The third prism 513 is disposed adjacent to the second prism 512 and the fourth prism 514. It has a specular surface Sm3 which is a connecting surface connected to the second prism 512, and a rough surface Sr3 which is a connecting surface connected to the fourth prism 514. A first blue light reflective film 522a for reflecting blue light B is formed on the specular surface Sm3.

The fourth prism 514 is disposed adjacent to the first prism 511 and the third prism 513. It has a first specular surface Sm4a which is a connecting surface connected to the third prism 513, and a second specular surface Sm4b which is a connecting surface connected to the first prism 511. A second red light reflective film 521b for reflecting red light R is formed on the first specular surface Sm4a, whereas a second blue light reflective film 522b for reflecting blue light B is formed on the second specular surface Sm4b.

The red light R incident upon the first prism 511 is reflected by the first red light reflective film 521a and the second red light reflective film 521b. When the red light R is reflected by the first red light reflective film 521a, it is reflected by the first red light reflective film 521a formed on the specular surface Sm1 of the first prism 511, so that the red light R is unaffected by the rough surface Sr2a of the second prism 512. On the other hand, when the red light R is to be reflected by the second red light reflective film 521b, it first passes through the interface between the first prism 511 and the fourth prism 514. Here, the red light R passes through the rough surface Sr1 of the first prism 511, but is not scattered at the rough surface Sr1 due to the connecting layer CL. When the red light R is reflected by the second red light reflective film 521b, it is reflected by the second red light reflective film 521b formed on the specular surface Sm4a of the fourth prism 514, so that it is virtually unaffected by the rough surface Sr3 of the third prism 513. The behavior of the blue light B with respect to the third prism 513 is similar.

Green light G incident upon the second prism 512 passes through the first red light reflective film 521a and the second blue light reflective film 522b, or passes through the first blue light reflective film 522a and the second red light reflective film 521b. In either case, the green light G passes through two rough surfaces, but is not scattered at the rough surfaces due to the connecting layers CL.

In the optical component, that is, the cross-dichroic prism 520 shown in FIG. 12, the connecting surfaces of one of two adjacent prisms, that is, a first columnar prism selected from the four columnar prisms 511 to 514 have roughness of approximately 3 nm to approximately 10 nm in terms of the rms value. The selection films 521a, 521b, 522a and 522b which select and pass light of a predetermined wavelength range are formed at a second columnar prism. The first and second prisms are joined together by the corresponding connecting layer CL. This makes it possible to easily produce the cross-dichroic prism 520 without considerably deteriorating the optical characteristics of the cross-dichroic prism 520.

In FIG. 12, the cross-dichroic prism 520 is illustrated as a color light synthesizing optical system provided in the projector 1000. However, the present invention may also be applied to a dichroic prism.

FIG. 13 illustrates a dichroic prism 550. The dichroic prism 550 includes two optical components, that is, color light selection prisms 560 and 570. The first color light selection prism 560 reflects red light R and passes green light G therethrough. The second color light selection prism 570 passes red light R and green light B which have exited from the first color light selection prism 560, and passes blue light B. The three color light beams R, G, and B are synthesized by the two color light selection prisms 560 and 570.

The first color light selection prism 560 includes two right-angled prisms 561 and 562, which are connected together by a connecting layer CL. The first right-angled prism 561 includes a rough surface Sr which is a connecting surface connected to the second right-angled prism 562. The second right-angled prism 562 includes a specular surface Sm which is a connecting surface connected to the first right-angled prism 561. A red light reflective film 551 for reflecting red light R is formed on the specular surface Sm.

The second color light selection prism 570 similarly includes two right-angled prisms 571 and 572, which are connected together by a connecting layer CL. The first right-angled prism 571 includes a rough surface Sr which is a connecting surface connected to the second right-angled prism 572. The second right-angled prism 572 includes a specular surface Sm which is a connecting surface connected to the first right-angled prism 571. A blue light reflective film 552 for reflecting blue light B is formed on the specular surface Sm.

The optical component 550 corresponds to the top half portion of the cross-dichroic prism 520 shown in FIG. 12 which has been cut away. Therefore, as in the cross-dichroic prism 520 shown in FIG. 12, each type of color light is virtually not scattered at the rough surfaces Sr or the joining surfaces of the corresponding first right-angled prisms 561 and 571.

As described above, in the optical component, such as the first color light selection prism 560 shown in FIG. 13, the connecting surface of the first right-angled prism 561 is defined as the surface which passes light which is processed by the optical component, has a roughness of approximately 3 nm to approximately 10 nm in terms of the rms value, and is connected to the second right-angled prism 562 by the connecting layer CL. This makes it possible to easily produce the first color light selection prism 560 without considerably deteriorating the optical characteristics of the first color light selection prism 560. The structure of the optical component such as, the second color light selection prism 570 is similar.

In the first and second color light selection prism 560 and 570 shown in FIG. 13, each of the first and second right-angled prisms 561, 562, 571, and 572 is formed of white sheet glass. In other words, the first right-angled prisms 561 and 571 correspond to glass used in the present invention, whereas the second right-angled prisms 562 and 572 having formed thereon corresponding selection films 551 and 552 for selecting and passing light of corresponding predetermined wavelength ranges correspond to optical members.

The cross-dichroic prism 520 shown in FIG. 12 and the dichroic prism 550 shown in FIG. 13 are used as color light synthesizing optical systems which synthesize three types of color light. If the direction of movement of light is reversed, they can be used as color light separation optical systems. More specifically, they can be used as color light separation optical systems by causing white light to enter from the light-exiting surfaces of the cross-dichroic prism 520 and the dichroic prism 550, and by causing each type of color light to exit from the light-incident surfaces of the cross-dichroic prism 520 and the dichroic prism 550. Therefore, these cross-dichroic and dichroic prisms 520 and 550 can be used in place of the color light separation optical system 200 shown in FIG. 1.

The present invention is not limited to the above-described embodiment and forms, so that the present invention can be carried out in various other forms within the gist of the present invention. For example, the following modifications are possible.

(1) I the above-described embodiment, a polarizer, a λ/2 phase film, a lens, a light-transmissive member having a polarization separation film formed thereon, a light-transmissive member having a selection film formed thereon, etc., are connected to glass by connecting layers CL. However, other optical members may be connected to the glass.

For example, instead of connecting the λ/2 phase film 303R of the first liquid crystal light valve 300R (FIGS. 4 and 6) to glass, a λ/4 phase film may be connected to the rough surface Sr2 of the second glass substitute 308R. In this case, the λ/4 phase film needs to be provided on the red-light-incident surface of the cross-dichroic prism 520.

Although, in the polarization beam splitter array 64 shown in FIG. 9, the structure of the present invention is used between the first and second glass substrates 64c1 and 64c2, it may be used between the first glass substrate 64c 1 of the polarization beam splitter array 64 and the λ/2 phase layer 66b of the selection retardation film 66.

In other words, the present invention is, in general, applicable to an optical component including glass, an optical member which is connected to glass, and a connecting layer used to connect a surface of the glass substrate and a surface of the optical member together. Any kind of optical member may be connected to the connecting surface of the glass substrate as long as the connecting surface is defined as the surface which passes light and has a roughness of approximately 3 nm to approximately 10 nm in terms of the rms value.

(2) Although, in the above-described embodiment, the present invention is applied to a transmissive projector, it may also be applied to a reflective projector.

Here, a transmissive projector is a type of projector in which an electro-optical device used as a light-modulation device transmits light like a transmissive liquid crystal panel, while a reflective projector is a type of projector in which an electro-optical device used as a light-modulation device reflects light like a reflective liquid crystal panel. Substantially the same advantages are provided when the present invention is applied to a reflective projector as when it is applied to a transmissive projector.

(3) Although, in the embodiment, the projector 1000 includes a liquid crystal panel as an electro-optical device, it may include a micro-mirror light modulation device instead. For example, a DMD (digital micro-mirror device), which is a trademark of TI, may be used as the micro-mirror light modulation device. In general, the electro-optical device used modulates incident light in accordance with image information.

(4) Although, in the embodiment, the projector 1000 is described as displaying a color image, it may also display a monochromatic image.

What is claimed is:

1. An optical component, comprising:
a glass substrate;
an optical member connected to the glass substrate; and
a connecting layer that connects a connecting surface of the glass substrate and a connecting surface of the optical member together,
the connecting surface of the glass substrate being defined as a surface which passes light processed by the optical component, and having a roughness of approximately 3 nm to approximately 10 nm in root mean square value.

2. The optical component according to claim 1, the glass substrate comprising sapphire glass.

3. The optical component according to claim 1, the optical component having an air contacting surface which contacts air and which passes therethrough light processed by the optical component, and an antireflection film formed on the surface air contacting an air contacting surface.

4. The optical component according to claim 1, the connecting layer having an index of refraction of approximately 1.2 to approximately 1.5.

5. The optical component according to claim 4, a ratio of an index of refraction of the connecting layer to an index of refraction of the glass substrate being approximately 0.8 to approximately 1.2.

6. The optical component according to claim 4, the optical member being a polarizer.

7. The optical component according to claim 4, the optical member being a retardation film.

8. The optical component according to claim 4, the optical member being a lens.

9. The optical component according to claim 4, the optical member being a light-transmissive member having a polarization separation film formed on the connecting surface of the optical member.

10. The optical component according to claim 4, the optical member being a light-transmissive member having a selection film that selects light of a predetermined wavelength range formed on the connecting surface of the optical member.

11. An optical component, comprising:
a plurality of first glass substrates and second glass substrates alternately disposed along a predetermined direction;
connecting layers that connect connecting surfaces of the first glass substrates and corresponding connecting surfaces of the second glass substrates; and
polarization separation films and reflective films alternately disposed at interfaces between the first glass substrates and the corresponding second glass substrates,
at the interfaces where the polarization separation films are disposed, the connecting surfaces of the first glass substrates each have a roughness of approximately 3 nm to approximately 10 nm in root mean square value, the polarization separation films being formed on the corresponding second glass substrates, and the connecting layers being correspondingly formed between the polarization separation films and the first glass substrates.

12. An optical component, comprising:
four columnar glass prisms divided at interfaces forming into a substantially X shape; and
connecting layers that correspondingly connect connecting surfaces of the four columnar glass prisms,
at least two adjacent columnar glass prisms being selected from the four columnar glass prisms, such that the connecting surface of a first of the at least two columnar glass prisms has a roughness of approximately 3 nm to approximately 10 nm in root mean square value, a second of the at least two columnar glass prism has a selection film that selects light of a predetermined wavelength range formed thereon, and the connecting layer of the first columnar glass prism is formed between the selection film and the first columnar prism.

13. A projector, comprising:
an illumination optical system that emits an illumination light beam therefrom;
an electro-optical device that modulates the light beam from the illumination optical system in accordance with image information; and a projection optical system the projects the modulated light beam modulated by the electro-optical device, one of the illumination optical system, the electro-optical device, and the projection optical system including an optical component which comprises a glass substrate, an optical member connected to the glass substrate, and a connecting layer that connects a connecting surface of the glass substrate and a connecting surface of the optical member, and the connecting surface of the glass substrate being defined as a surface which passes therethrough light processed by the optical component, and having a roughness of approximately 3 nm to approximately 10 nm in root mean square value.

14. The projector according to claim 13, the glass substrate is comprising sapphire glass.

15. The projector according claim 13, the optical component having an antireflection film formed on a surface of the optical component which contacts air and passing light processed by the optical component.

16. The projector according to claim 13, an the index of refraction of the connecting layer being approximately 1.2 to approximately 1.5.

17. The projector according to claim 16, a ratio of an index of refraction of the connecting layer to an index of refraction of the glass substrate being approximately 0.8 to approximately 1.2.

18. The projector according to claim 16, the optical component being disposed on at least one of a light-incident-surface side and a light-exiting-surface side of the electro-optical device, and the optical member being a polarizer.

19. The projector according to claim 16, the optical component being disposed on at least one of a light-incident-surface side and a light-exiting-surface side of the electro-optical device, and the optical member being a retardation film.

20. The projector according to claim 16, the optical component being provided in one of the illumination optical system and the projection optical system, the optical component being a lens.

21. A projector, comprising:
an illumination optical system that emits an illumination light beam therefrom;
an electro-optical device that modulates the light beam from the illumination optical system in accordance with image information; and
a projection optical system that projects the modulated light beam modulated by the electro-optical device,
the illumination optical system comprising:
a polarization generation section which emits a predetermined polarized light beam therefrom, the polarization generation section comprising an optical component that separates the light beam incident thereupon into two types of polarized light beams, and a selection retardation film that converts one of the two types of polarized light beams emitted from the optical component to another of the two types of polarized light beams,
the optical component comprising:
a plurality of first glass substrates and second glass substrates alternately disposed along a predetermined direction;
connecting layers that connect connecting surfaces of the first glass substrates and corresponding connecting surfaces of the second glass substrates; and
polarization separation films and reflective films alternately disposed at interfaces between the first glass substrates and the corresponding second glass substrates, at the interfaces where the polarization separation films are disposed, the connecting surfaces of the first glass substrates each having a roughness of approximately 3 nm to approximately 10 nm root mean square value, the polarization separation films being formed on the corresponding second glass substrates, and the connecting layers being correspondingly formed between the polarization separation films and the first glass substrates.

22. A projector that projects and displays a color image, comprising:
an illumination optical system that emits an illumination light beam therefrom;
a color light separation optical system that separates the illumination light beam from the illumination optical system into light beams of three color components, a first color light beam, a second color light beam and a third color light beam;
a first electro-optical device, a second electro-optical device and a third electro-optical device that generate a first modulated light beam, a second modulate light beam and a third modulated light beam, respectively, as a result of modulating in accordance with image information the first color light beam, the second color light beam and the third color light beam separated by the color light separation optical system;
a color light synthesizing optical system that synthesizes the first modulated light beam, the second color light beam and the third modulated light beam;
a projection optical system that projects synthesized light beams from the color light synthesizing optical system; and
an optical component provided in any one of the illumination optical system, the color light separation optical system, the first electro-optical device, the second electro-optical device, the third electro-optical device, the color light synthesizing optical system, and the projection optical system, the optical component comprising:
glass substrate;
an optical member connected to the glass substrate; and
a connecting layer that connects a connecting surface of the glass substrate and a connecting surface of the optical member together,
the connecting surface of the glass substrate being defined as a surface which passes light processed by the optical component, and having a roughness of approximately 3 nm to approximately 10 nm in root mean square value.

23. A projector that projects and displays a color image, comprising:
an illumination optical system that emits an illumination light beam to exit therefrom;
a color light separation optical system that separates the illumination light beam from the illumination optical system into light beams having three color components, a first color light beam, a second color light beam and a third color light beam;
a first electro-optical device, a second electro-optical device and a third electro-optical device that generate a first modulated light beam, a second modulated light beam and a third modulated light beam, respectively, as a result of modulating in accordance with image information the first color light beam, the second color light beam and the third color light beam separated by the color light separation optical system;

a color light synthesizing optical system that synthesizes the first modulated light beam, the second modulated light beam and the third modulated light beam;

a projection optical system that projects the synthesized light beams from the color light synthesizing optical system; and an optical component provided in one of the color light separation optical system and the color light synthesizing optical system, the optical component comprising four columnar glass prisms divided at interfaces forming a substantially X shape, and connecting layers that connect connecting surfaces of the four corresponding columnar glass prisms together, at least two adjacent columnar glass prisms selected from the four columnar glass prisms being such that the connecting surface of a first of the at least two adjacent columnar glass prisms having a roughness of approximately 3 nm to approximately 10 nm in root mean square value, a second of the at least two adjacent columnar glass prism having a selection film that selects light of a predetermined wavelength range formed thereon, and the connecting layer of the first columnar glass prism being formed between the selection film and the first columnar glass prism.

\* \* \* \* \*